US009830519B2

(12) United States Patent
Hayakawa et al.

(10) Patent No.: US 9,830,519 B2
(45) Date of Patent: *Nov. 28, 2017

(54) THREE-DIMENSIONAL OBJECT DETECTION DEVICE

(71) Applicant: Nissan Motor Co., Ltd., Yokohama-shi, Kanagawa (JP)

(72) Inventors: Yasuhisa Hayakawa, Yokohama (JP); Osamu Fukata, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 110 days.

This patent is subject to a terminal disclaimer.

(21) Appl. No.: 14/373,049

(22) PCT Filed: Feb. 26, 2013

(86) PCT No.: PCT/JP2013/054853

§ 371 (c)(1),
(2) Date: Jul. 18, 2014

(87) PCT Pub. No.: WO2013/129352

PCT Pub. Date: Sep. 6, 2013

(65) Prior Publication Data

US 2015/0002671 A1    Jan. 1, 2015

(30) Foreign Application Priority Data

Mar. 1, 2012 (JP) .................. 2012-045349

(51) Int. Cl.
*H04N 7/18* (2006.01)
*G06K 9/00* (2006.01)
*G08G 1/16* (2006.01)

(52) U.S. Cl.
CPC ..... *G06K 9/00805* (2013.01); *G06K 9/00825* (2013.01); *G08G 1/16* (2013.01);
(Continued)

(58) Field of Classification Search
CPC ............................................... G06K 9/00201
(Continued)

(56) References Cited

U.S. PATENT DOCUMENTS 6,411,204 B1 * 6/2002 Bloomfield ............ B60Q 1/302
340/464
2011/0310245 A1 * 12/2011 Tsuchiya ................. G01S 11/12
348/135

(Continued)

FOREIGN PATENT DOCUMENTS

EP    2400315 A1    12/2011
JP    2000-285245 A    10/2000
(Continued)

OTHER PUBLICATIONS

Lin et al., "Construction of Fisheye Lens Inverse Perspective Mapping Model and Its Applications of Obstacle Detection", Jun. 2010, Hindawi Publishing Corporation, EURASIP Journal on Advance in Signal Processing.*

Chin-Teng Lin, "Construction of Fisheye Lens Inverse Perspective Mapping Model and Its Applications of Obstacle Detection," EURASIP Journal on Advances in Signal Processing, Feb. 2010, Article No. 8, vol. 2010, Hindawi Publishing Corporation, USA.

*Primary Examiner* — Jeremaiah C Hallenbeck-Huber
*Assistant Examiner* — Amir Shahnami
(74) *Attorney, Agent, or Firm* — Global IP Counselors, LLP

(57) ABSTRACT

A three-dimensional object detection device includes an image capturing unit, an image conversion unit, a three-dimensional object detection unit, a light source detection unit and a control unit. The image conversion unit converts a viewpoint of the images obtained by the image capturing unit to create bird's-eye view images. The three-dimensional object detection unit detects a presence of a three-dimensional object within the adjacent lane. The three-dimensional object detection unit determines the presence of the three-dimensional object within the adjacent lane-when the difference waveform information is at a threshold value or higher. The control unit set a threshold value higher so that the three-dimensional object is more difficult to detect in a forward area than rearward area with respect to a line (Continued)

connecting the light source and the image capturing unit when the light source has been detected.

13 Claims, 34 Drawing Sheets

(52) U.S. Cl.
CPC ............ *G08G 1/165* (2013.01); *G08G 1/166* (2013.01); *G08G 1/167* (2013.01); *B60R 2300/60* (2013.01); *B60R 2300/804* (2013.01); *B60R 2300/8066* (2013.01); *B60R 2300/8093* (2013.01); *H04N 7/183* (2013.01)

(58) Field of Classification Search
USPC ........................................................ 348/148
See application file for complete search history.

(56) References Cited

U.S. PATENT DOCUMENTS

| 2013/0131922 A1* | 5/2013 | Ogata ................... B60Q 1/143 701/36 |
| 2013/0141542 A1 | 6/2013 | Tsuchiya et al. |

FOREIGN PATENT DOCUMENTS

| JP | 2003-312408 A | 11/2003 |
| JP | 2008-158958 A | 7/2008 |
| JP | 2008-219063 A | 9/2008 |
| JP | 2008-227646 A | 9/2008 |
| JP | 2009-265783 A | 11/2009 |
| WO | 2012/014735 A1 | 2/2012 |
| WO | 2012023412 A1 | 2/2012 |

* cited by examiner

THREE-DIMENSIONAL OBJECT DETECTION DEVICE

CROSS-REFERENCE TO RELATED APPLICATIONS

This application is a U.S. National stage application of International Application No. PCT/JP2013/054853, filed Feb. 26, 2013, which claims priority to Japanese Patent Application No. 2012-045349 filed in Japan on Mar. 1, 2012. The entire disclosure of Japanese Patent Application No. 2012-045349 is hereby incorporated herein by reference.

BACKGROUND

Field of the Invention

The present invention relates to a three-dimensional object detection device.

Background Information

In a conventionally known technique, two captured images captured at different times are converted to a bird's-eye view image, and an obstacle is detected based on differences in the two converted bird's-eye view images (see Japanese Laid-Open Patent Application No. 2008-227646).

SUMMARY

When another vehicle traveling in an adjacent lane adjacent to the lane in which the host vehicle is traveling is to be detected at nighttime using an image in which the rearward of a host vehicle has been captured, and when light from the headlights of another vehicle traveling in a lane adjacent to the adjacent lane (also be referred to below as adjacent-adjacent lane) is shined into detection areas, there may cases in which an image of the light from the headlights is errantly detected as an adjacent vehicle traveling in an adjacent lane. The light from the headlights is characteristic in being very bright, and it is possible to identify the light of the headlights of a vehicle traveling in an adjacent-adjacent lane in accordance with luminance, but there is a problem in that when the lens of a capture device is dirty, the light from the headlights of another vehicle traveling in an adjacent-adjacent lane is irregularly reflected, the luminance around the headlights is increased, and an adjacent vehicle positioned near the headlights cannot be suitably detected.

The problem to be solved by the present invention is to eliminate the effect of headlights of another vehicle when another vehicle traveling in an adjacent lane adjacent to the lane in which the host vehicle is traveling is detected, and to accurately detect another vehicle traveling in an adjacent lane.

The present invention solves the problem by detecting a light source present rearward of the host vehicle, and increasing a detection level for detecting a three-dimensional object present in an adjacent lane, so that the three-dimensional object is difficult to detect in an area forward from a line connecting the detected light source and the capture device.

In accordance with the present invention, increasing the level for detecting an adjacent vehicle in the area forward of the headlights (light source) effectively prevents errant detection of an adjacent vehicle near the headlights while allowing a tire/wheel of the adjacent vehicle present rearward from the headlights (light source) to be suitably detected, and an therefore allows the adjacent vehicle traveling in an adjacent lane to be suitably detected.

BRIEF DESCRIPTION OF THE DRAWINGS

Referring now to the attached drawings which form a part of this original disclosure.

DETAILED DESCRIPTION OF THE EMBODIMENTS

Figure 1:
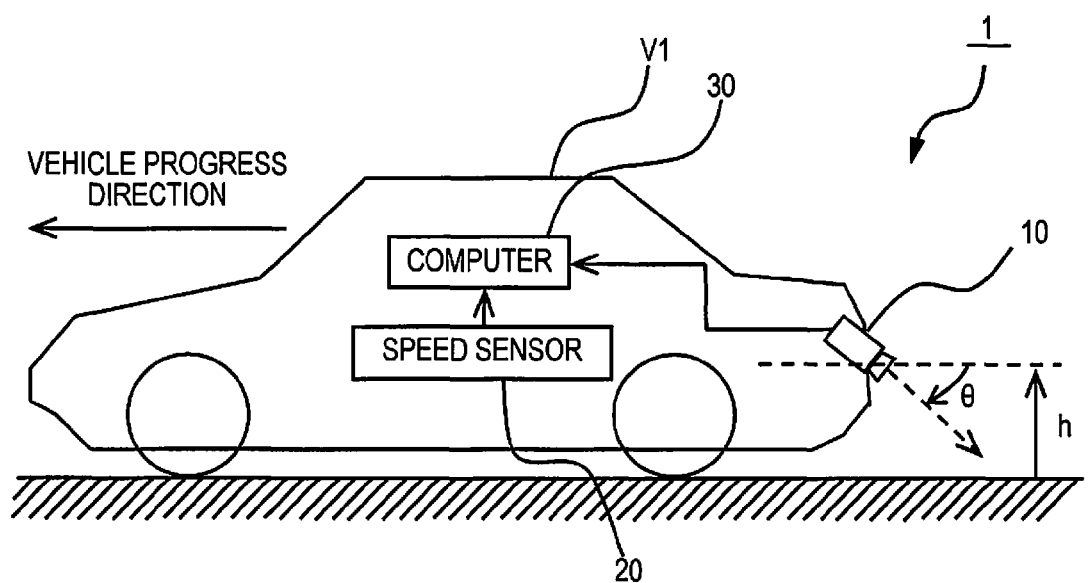
FIG. 1 is a schematic structural diagram of a vehicle in which a three-dimensional object detection device according to the first embodiment has been mounted.

FIG. 1 is a schematic overview of a vehicle in which a three-dimensional object detection device 1 according to the first embodiment has been mounted. An object of the three-dimensional object detection device 1 according to the present embodiment is to detect another vehicle (may hereinbelow be referred to as "adjacent vehicle") present in an adjacent lane where contact is possible should a host vehicle V1 change lanes. The three-dimensional object detection device 1 according to the present embodiment is provided with a camera 10, a speed sensor 20, a computer 30, and a warning device 40, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The speed sensor 20 detects the travel speed of the host vehicle V1 and calculates the vehicle speed from a wheel speed detected by, e.g., a wheel speed sensor for detecting the rotational speed of a wheel. The computer 30 detects an adjacent vehicle present in an adjacent lane rearward of the host vehicle.

Figure 2:
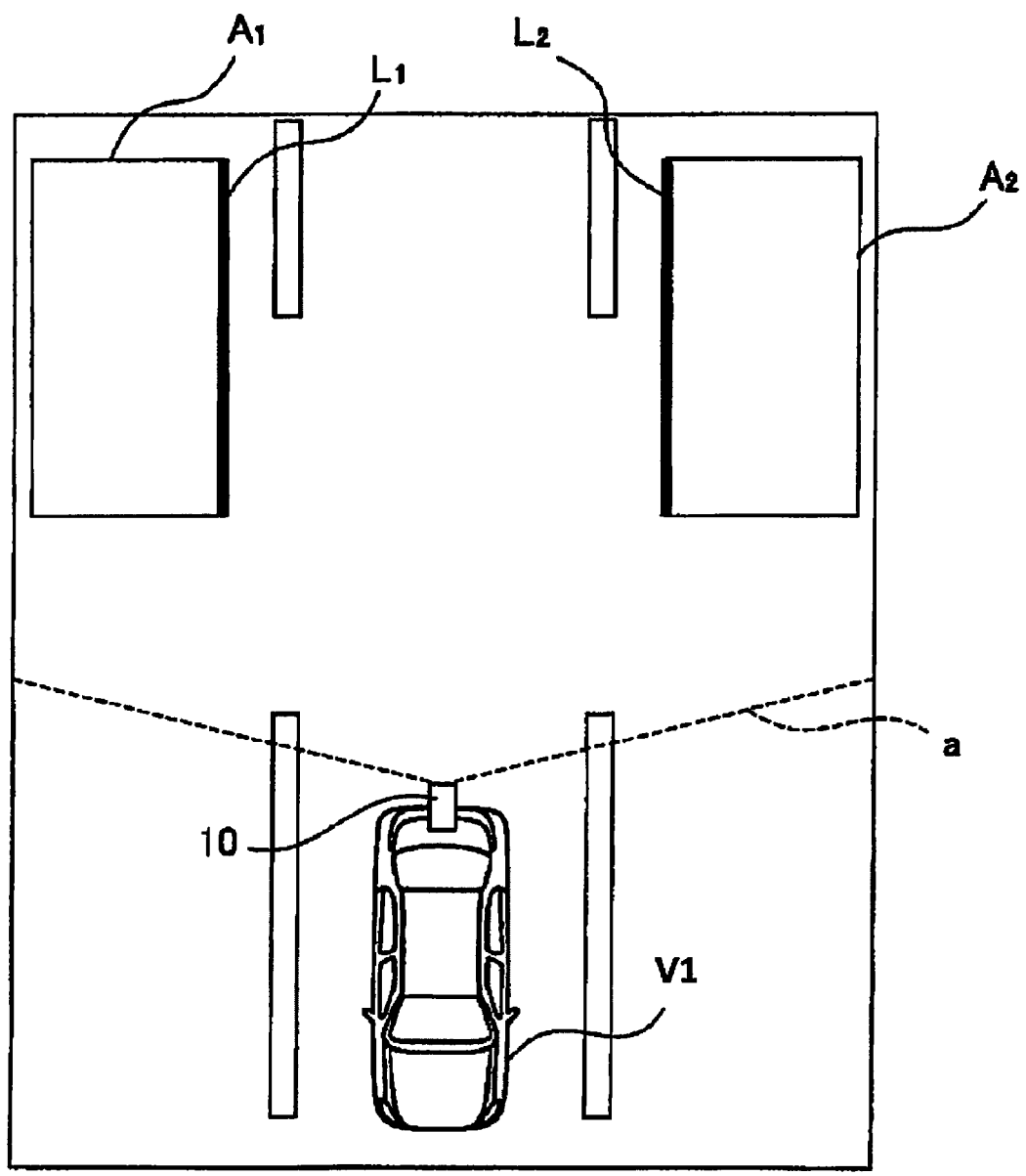
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (adjacent lanes) to be captured in addition to the lane in which the host vehicle V1 is traveling.

Figure 3:
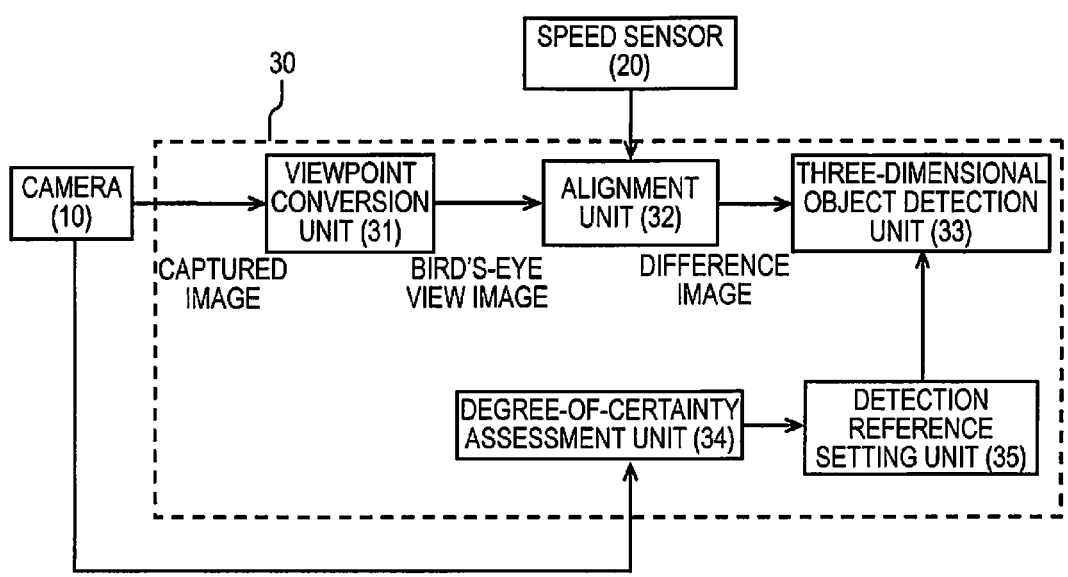
FIG. 3 is a block diagram illustrating the details of the computer according to the first embodiment.

FIG. 3 is a block view illustrating the details of the computer 30 of FIG. 1. The camera 10 and the speed sensor 20 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, a degree-of-certainty assessment unit 34, and a detection reference setting unit 35. The configurations of these units are described below.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated.

Figure 4:
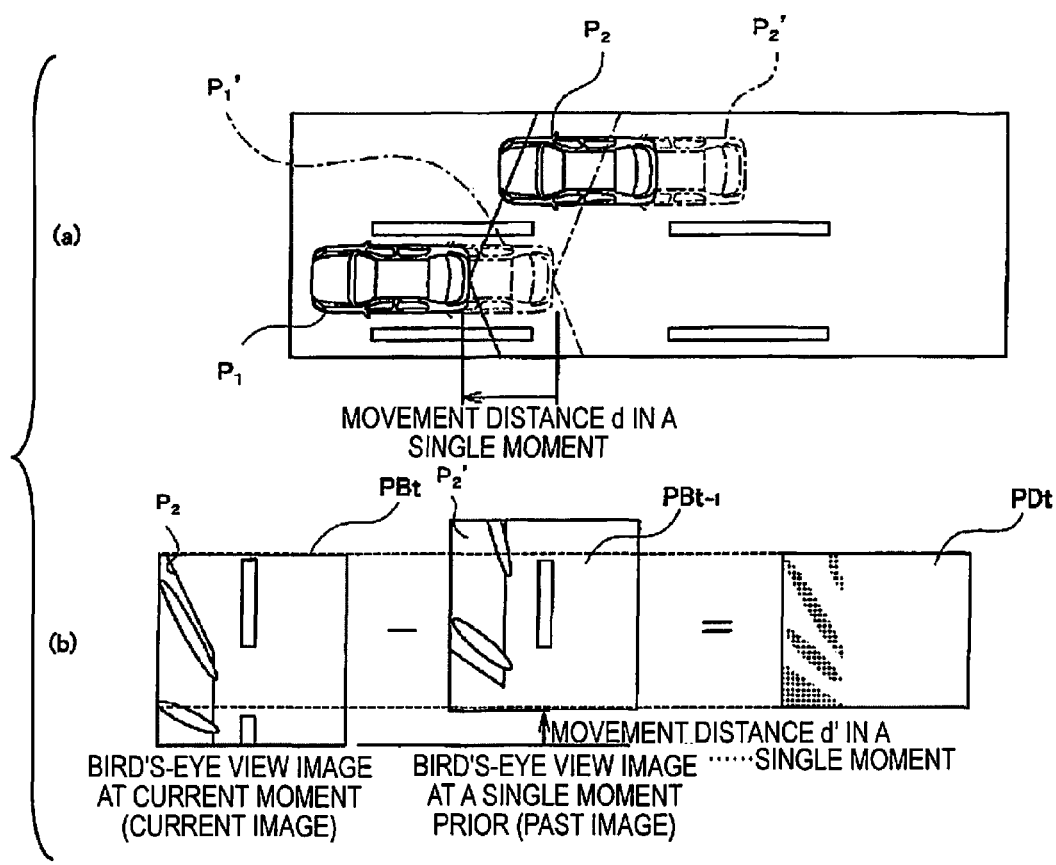
FIG. 4 is a view describing the general overview of the processing of the alignment unit according to the first embodiment, with part (a) illustrating the movement state of the vehicle from a top plan view, and part (b) illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different times are aligned. FIG. 4 is a view for describing the general overview of the processing of the alignment unit 32, with part (a) illustrating the movement state of the host vehicle V1 from a top plan view, and part (b) illustrating a general overview of alignment.

As illustrated in part (a) of FIG. 4, the host vehicle V1 at the current moment is positioned at $P_1$, and the host vehicle V1 at a single moment prior is positioned at $P_1'$. It is assumed that an adjacent vehicle V2 is positioned in the rear-side direction of the host vehicle V1 and is travelling parallel to the host vehicle V1, and that the adjacent vehicle V2 at the current moment is positioned at $P_2$, and the adjacent vehicle V2 at a single moment prior is positioned at $P_2'$. Also, it is assumed that the host vehicle V1 has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a movement distance d'. The offset amount d' is the amount of movement in the bird's-eye view image data that corresponds to the actual movement distance d of the host vehicle V1 illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates difference image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," which allows difference image $PD_t$ data such as that illustrated on the right side of part (b) of FIG. 4 to be generated.

Returning to FIG. 3, the three-dimensional object detection unit 33 detects a three-dimensional object based on the difference image $PD_t$ data illustrated in part (b) of FIG. 4. In this case, the three-dimensional object detection unit 33 calculates the movement distance of the three-dimensional object in real space. The three-dimensional object detection unit 33 first generates a difference waveform when the three-dimensional object is detected and the movement distance is to be calculated.

In generating the difference waveform, the three-dimensional object detection unit 33 sets a detection area in the difference image $PD_t$. An object of the three-dimensional object detection device 1 of the present example is to calculate the movement distance for the adjacent vehicle with which there is a possibility of contact should the host vehicle V1 change lanes. Accordingly, in the present example, rectangular detection areas A1, A2 are set behind the host vehicle V1, as illustrated in FIG. 2. Such detection areas A1, A2 may be set from a relative position to the host vehicle V1, or may be set based on the position of the white lines. When set based on the position of the white lines, the three-dimensional object detection device 1 may use, e.g., known white line recognition techniques.

The three-dimensional object detection unit 33 recognizes as ground lines L1, L2 the borders of the detection areas A1, A2 thus set, on the host vehicle V1 side (side along the traveling direction), as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
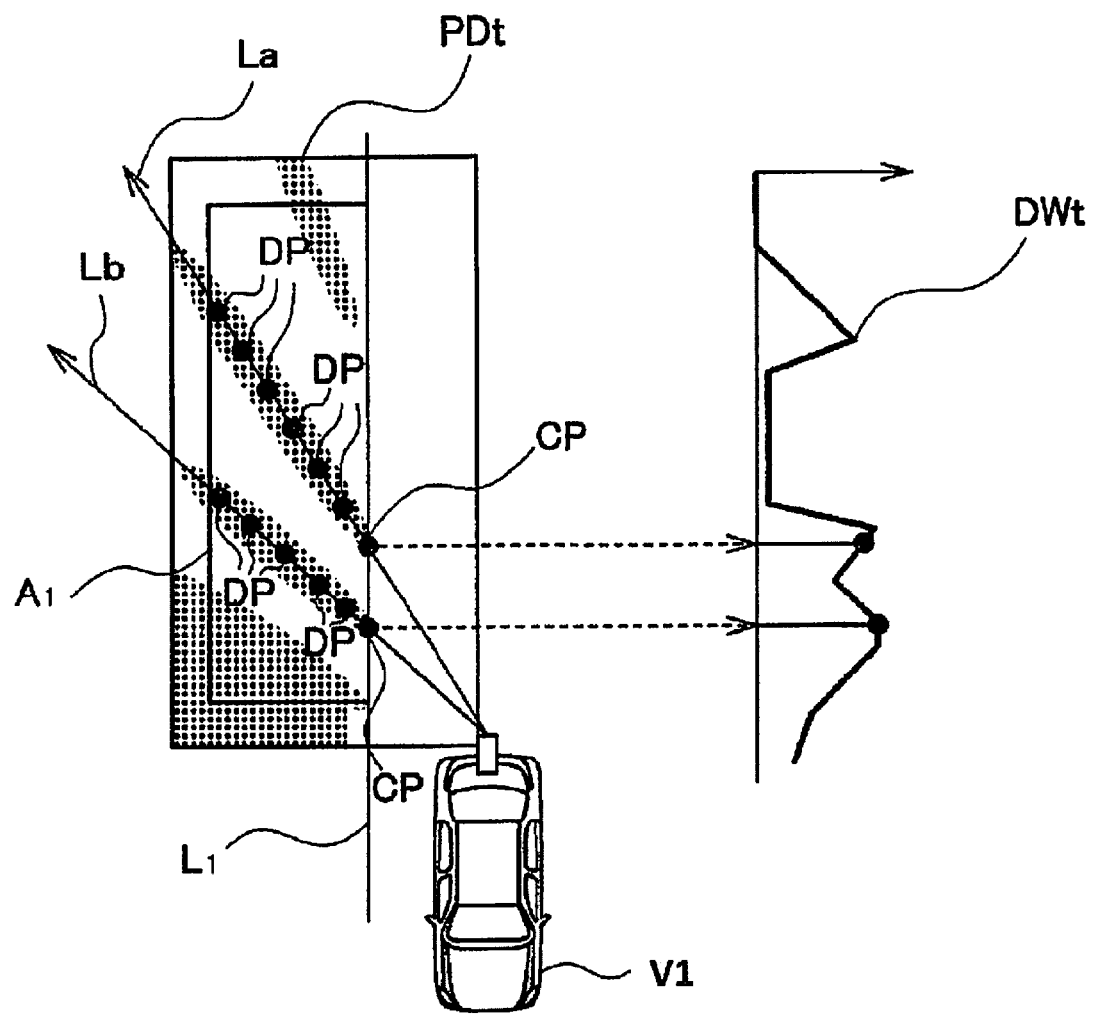
FIG. 5 is a schematic view illustrating the manner in which the difference waveform is generated by the three-dimensional object detection unit according to the first embodiment.

FIG. 5 is a schematic view illustrating the manner in which the difference waveform is generated by the three-dimensional object detection unit 33. As illustrated in FIG. 5, the three-dimensional object detection unit 33 generates a difference waveform $DW_t$ from the portion that corresponds to the detection areas A1, A2 in the difference image $PD_t$ (drawing on the right in part (b) of FIG. 4) calculated by the alignment unit 32. In this case, the three-dimensional object detection unit 33 generates a difference waveform $DW_t$ along the collapsing direction of the three-dimensional object by viewpoint conversion. In the example illustrated in FIG. 5, only the detection area A1 will be described for the sake of convenience, but the difference waveform $DW_t$ is generated for the detection area A2 as well using the same procedure.

More specifically, first, the three-dimensional object detection unit 33 defines a line La in the direction in which the three-dimensional object collapses in the difference image $PD_t$ data. The three-dimensional object detection unit 33 then counts the number of difference pixels DP indicating a predetermined difference on the line La. In the present embodiment, the difference pixels DP indicating a predetermined difference have pixel values in the difference image $PD_t$ that are represented by "0" and "1," and the pixels indicated by "1" are counted as difference pixels DP.

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a first difference waveform $DW1_t$ as illustrated in the drawing on the right in FIG. 5.

Here, the difference pixels DP in the difference image $PD_t$ data are pixels which have changed in the image at different moments, in other words, locations that can be construed to be where a three-dimensional object was present. Accordingly, in locations where a three-dimensional object was present, the number of pixels is counted along the direction in which the three-dimensional object collapses to form a frequency distribution and thereby generate a difference waveform $DW_t$. In particular, the number of pixels is counted along the direction in which the three-dimensional object collapses, and a difference waveform $DW_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the difference waveform $DW_t$ that correspond to the lines La, Lb in the direction in which the three-dimensional object collapses are thereby made substantially the same, as illustrated in the difference waveform $DW_t$.

Figure 6:
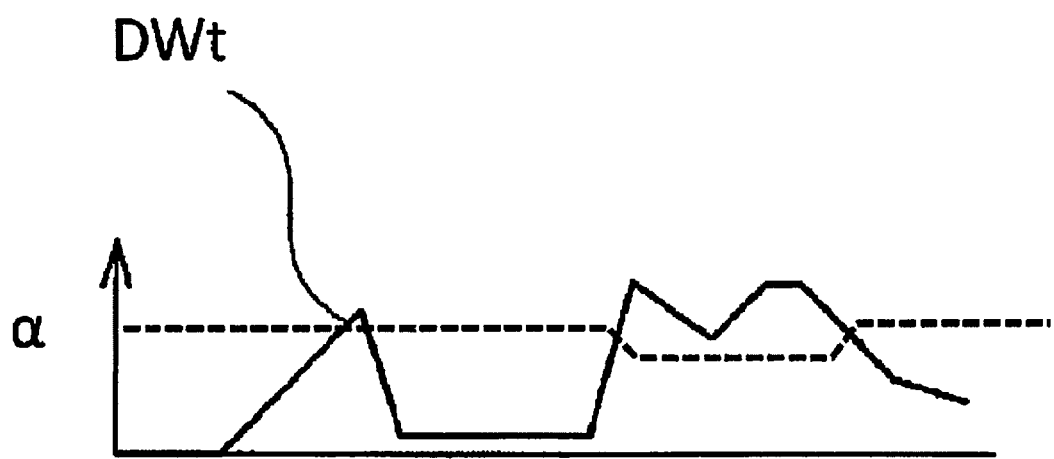
FIG. 6 is a view describing the method for detecting an adjacent vehicle according to the first embodiment.

After the difference waveform $DW_t$ has been generated, the three-dimensional object detection unit 33 detects an adjacent vehicle present in the adjacent lane based on the generated difference waveform $DW_t$. Here, FIG. 6 is a view describing the method for detecting an adjacent vehicle carried out by the three-dimensional object detection unit 33, and illustrates an example of the difference waveform $DW_t$ and the threshold value α for detecting an adjacent vehicle. The three-dimensional object detection unit 33 determines whether the peak of the generated difference waveform $DW_t$ is equal to or greater than the threshold value α corresponding to the position of the peak of the difference waveform $DW_t$, as illustrated in FIG. 6. The three-dimensional object detection unit 33 then determines that an adjacent vehicle is not present in the detection areas A1, A2 when the peak of the difference waveform $DW_t$ is less than the predetermined threshold value α, and conversely determines that an adjacent vehicle is present in the detection areas A1, A2 when the peak of the difference waveform $DW_t$ is at the predetermined threshold value α or greater to thereby detect an adjacent vehicle present in an adjacent lane.

Thus, the difference waveform $DW_t$ is a mode of distributed information of pixels that indicate a predetermined difference in luminance, and the "distributed information of pixels" in the present embodiment can be positioned with information indicating the state of distribution of "pixels having a difference in luminance that is equal to or greater than a predetermined threshold value" detected along the direction which the three-dimensional object collapses when the captured image is converted in viewpoint to create a bird's-eye view image. In other words, the three-dimensional object detection unit 33 detects, on the bird's-eye view image obtained by the viewpoint conversion unit 31, distributed information of pixels in which the luminance difference is a predetermined threshold value th or greater as the difference waveform $DW_t$ in the direction which the three-dimensional object collapses when the captured image is converted in viewpoint to create a bird's-eye view image, and furthermore detects a three-dimensional object based on the difference waveform $DW_t$ when the extent of distribution of pixels (the count number of difference pixels DP in the difference waveform $DW_t$) in the direction in which the three-dimensional object collapses is at a threshold value α or greater.

Described next is the method for setting the threshold value α for detecting an adjacent vehicle.

The threshold value α is set by the detection reference setting unit 35 illustrated in FIG. 3. As described below, in the present embodiment, the detection reference setting unit 35 sets, based on a degree of certainty detected by the degree-of-certainty assessment unit 34, the threshold value $α_1$ set in accordance with the rearward distance from the camera 10 or the threshold value $α_2$ set in accordance with the positional relationship between the camera 10 and the light source as the threshold value α for detecting an adjacent vehicle based on the difference waveform $DW_t$ illustrated in FIG. 3.

When a light source is detected in the rearward direction of the host vehicle, the degree-of-certainty assessment unit 34 makes an assessment using as the degree of certainty the probability that the detected light source is the headlights of another vehicle (hereinbelow referred to as the adjacent-adjacent vehicle) traveling in an adjacent-adjacent lane (the lane two lanes adjacent to the host vehicle lane) in the rearward direction of the host vehicle. Described below is the method for assessing the degree of certainty carried out by the degree-of-certainty assessment unit 34. In the present embodiment, the detection of a light source is carried out by the detection reference setting unit 35, as described below.

In the present embodiment, the degree-of-certainty assessment unit 34 assesses the degree of certainty that a detected light source is the headlights of an adjacent-adjacent vehicle based on the number of detected light sources, the position of a light source, and the change in time in the state of a light source.

For example, the degree-of-certainty assessment unit 34 determines that a detected light source is, e.g., a street light, an illuminated sign, or the like and that the possibility that the detected light source is the headlights of an adjacent-adjacent vehicle is low when the number of light sources detected in the detection areas A1, A2 is high, and assesses the degree of certainty that the detected light source is the headlights of an adjacent-adjacent vehicle to be low.

The degree-of-certainty assessment unit 34 assesses the degree of certainty that the detected light source is the headlights of an adjacent-adjacent vehicle based on the position of the light source, i.e., the height of the light source (the position of the light source in the perpendicular direction), the position and vehicle width of the light source, and the position of the light source in the direction of progress of the host vehicle. For example, when the location of the light source is high, the degree-of-certainty assessment unit 34 determines that there is a high possibility that the detected light source is from a street light, and assesses the degree of certainty that the detected light source is the headlights of an adjacent-adjacent vehicle to be low. Also, the degree-of-certainty assessment unit 34 determines that the farther the position of the light source is in the vehicle width direction from the host vehicle, the greater the possibility is that the detected light source is the headlights of an adjacent-adjacent vehicle present in an adjacent-adjacent lane, which is farther away from the host vehicle than is the adjacent lane, and assesses the degree of certainty that the detected light source is the headlights of the adjacent-adjacent vehicle to be high. Furthermore, the degree-of-certainty assessment unit 34 determines that the farther the position of the light source is in the direction of progress of the host vehicle, the lesser the possibility is that the detected light source is the headlights of an adjacent-adjacent vehicle, and assesses the degree of certainty that the detected light source is the headlights of the adjacent-adjacent vehicle to be low.

The degree-of-certainty assessment unit 34 furthermore assesses the degree of certainty that the detected light source is the headlights of an adjacent-adjacent vehicle based on the change in time of the state of the light source. For example, when the change in time of the size of the detected light source is small, the degree-of-certainty assessment unit 34 determines that there is a high possibility that the detected light source is the headlights of an adjacent-adjacent vehicle traveling in the adjacent-adjacent lane farther from the host vehicle than the adjacent lane, and assesses the degree of certainty that the detected light source is the headlights of an adjacent-adjacent vehicle to be high. In another example, when the change in time in the position of the detected light source is small, or when the change in time in the luminance of the detected light source is small, the degree-of-certainty assessment unit 34 determines that there is a high possibility that the detected light source is the headlights of an adjacent-adjacent vehicle traveling in the adjacent-adjacent lane farther from the host vehicle than the adjacent lane, and assesses the degree of certainty that the detected light source is the headlights of an adjacent-adjacent vehicle to be high.

The degree-of-certainty assessment unit 34 then comprehensively assesses the degree of certainty that a detected light source is the headlights of an adjacent-adjacent vehicle based on the number of light sources, the position of a light source, and the change in time in state of a light source. Comprehensively determining the number of light sources, the position of a light source, and the change in time in state of a light source in this manner makes it possible to suitably determine whether a detected light source is from the headlights of an adjacent-adjacent vehicle. The degree-of-certainty assessment unit 34 may be configured to give consideration to the size of the detected light source when the degree of certainty is assessed. For example, the degree-of-certainty assessment unit 34 may be configured to assess the degree of certainty to be low when the size of the detected light source is considerably greater than the size of common headlights of an adjacent-adjacent vehicle.

The detection reference setting unit 35 then determines whether the degree of certainty assessed by the degree-of-certainty assessment unit 34 is at a predetermined value or higher; when the degree of certainty is less than a predetermined value, sets the first threshold value $\alpha_1$, which was set in accordance with the rearward distance from a later-described camera 10, to be a threshold value $\alpha$ for detecting an adjacent vehicle based on the difference waveform $DW_t$; and conversely, when the degree of certainty is at the predetermined value or higher, sets the second threshold value $\alpha_2$, which was set in accordance with the positional relationship between the later-described camera 10 and the light source, to be a threshold value $\alpha$ for detecting an adjacent vehicle based on the difference waveform $DW_t$.

The method for setting the first threshold value $\alpha_1$ that corresponds to the rearward distance from the camera 10 will first be described here.

Figure 7:
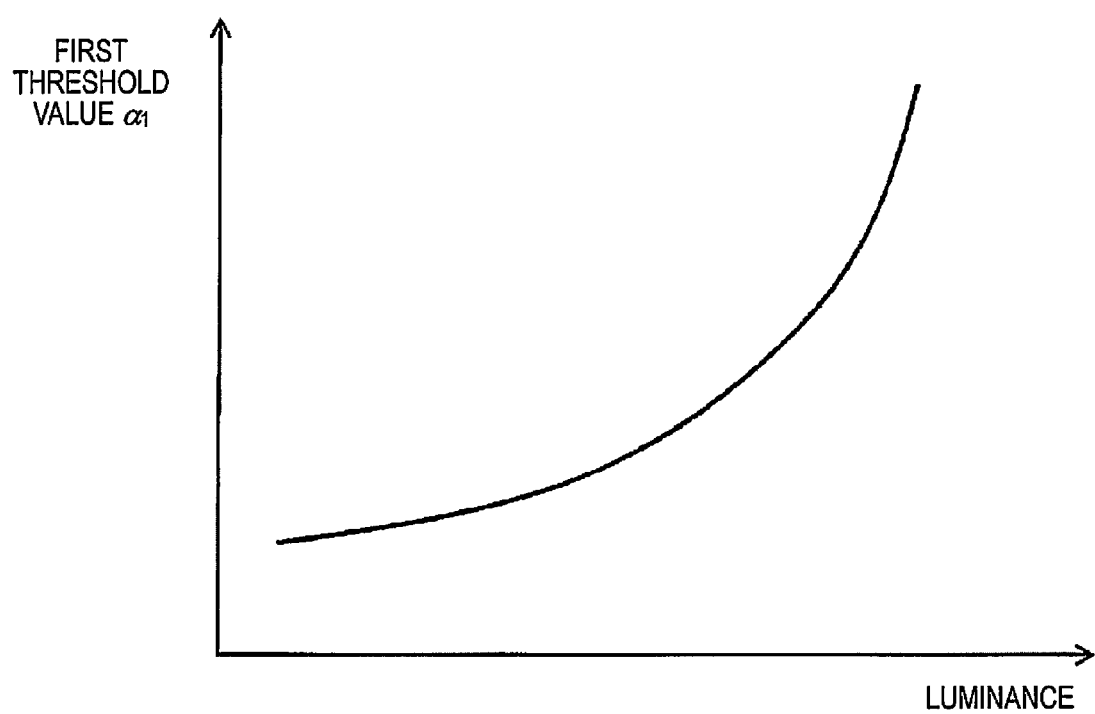
FIG. 7 is a graph illustrating an example of the relationship between the luminance in the detection positions in the detection areas A1, A2 and the first threshold value $\alpha_1$.
Figure 8:
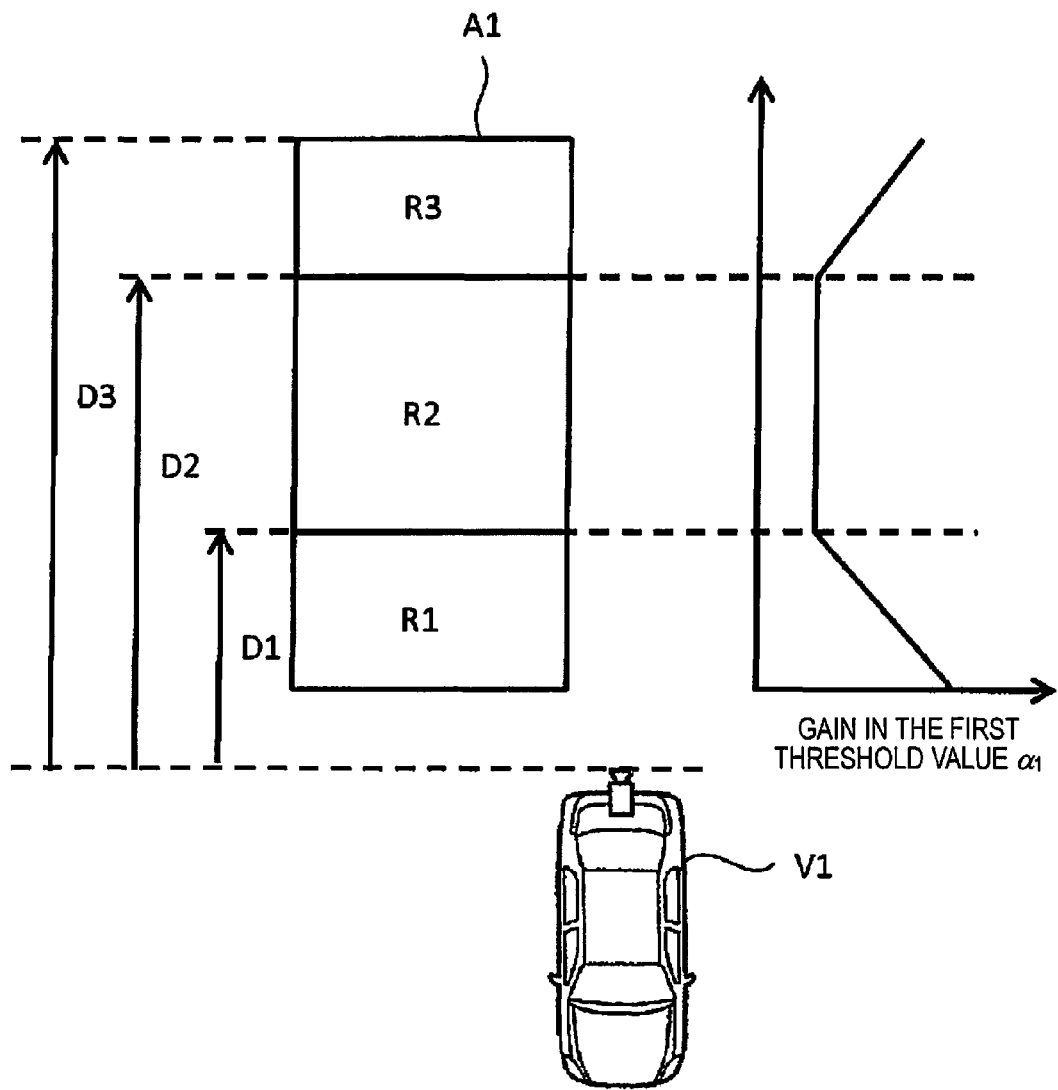
FIG. 8 is a view describing the relationship between the rearward distance from the camera and the first threshold value $\alpha_1$.

The detection reference setting unit 35 sets the first threshold value $\alpha_1$ in accordance with the luminance in the detection positions in the detection areas A1, A2 (e.g., the average luminance of the difference pixels DP on the lines La, Lb, Lc in the direction in which the three-dimensional object collapses illustrated in the drawing on the left in FIG. 5) and the rearward distance from the camera 10 for each position in the detection areas A1, A2 (hereinbelow referred to as detection positions in the detection areas A1, A2) corresponding to the lines La, Lb, Lc in the direction in which the three-dimensional object collapses illustrated in the drawing on the left in FIG. 5. Here, FIG. 7 is a graph illustrating an example of the relationship between the luminance in the detection positions in the detection areas A1, A2 and the first threshold value $\alpha_1$. FIG. 8 is a view describing the relationship between the rearward distance from the camera 10 and the first threshold value $\alpha_1$.

Specifically, the detection reference setting unit 35 sets the first threshold value $\alpha_1$ corresponding to the detection positions of the detection areas A1, A2 to a higher value in commensurate fashion to higher luminance in the detection positions, as illustrated in FIG. 7. The peak of the difference waveform $DW_t$ based on the light from the headlights of an adjacent-adjacent vehicle is less than first threshold value $\alpha_1$ and the effect of the light of the headlights of the adjacent-adjacent vehicle can be eliminated even when, e.g., the light of the headlights of the adjacent-adjacent vehicle (the vehicle present in the adjacent-adjacent lane two lanes away from the host vehicle lane) having high luminance is shined into the adjacent lane. It is therefore possible to effectively prevent an image of the light of the headlights of the adjacent-adjacent vehicle from being errantly detected as an adjacent vehicle.

The detection reference setting unit 35 furthermore modifies the first threshold value $\alpha_1$ set in accordance with the luminance in the detection positions in the detection areas A1, A2 based on the gain in the first threshold value $\alpha_1$ set in accordance with the rearward distance from the camera 10. For example, divides the detection areas A1, A2 into three areas in accordance with the rearward distance from the camera 10, as illustrated in the drawing on the left in FIG. 8. In the example illustrated in the drawing on the left in FIG. 8, the detection reference setting unit 35 divides the detection areas A1, A2 into an area R1 in which the rearward distance from the camera 10 is less than a distance D1, an area R2 in which the rearward distance from the camera 10 is the distance D1 or greater and less than a distance D2, and an area R3 in which the rearward distance from the camera 10 is the distance D2 or greater and less than a distance D3. In FIG. 8, only the detection area A1 is shown and described, but the gain in the first threshold value $\alpha_1$ is set in the same manner for detection area A2.

As illustrated in the drawing on the right in FIG. 8, the gain in the first threshold value $\alpha_1$ is set in accordance with the rearward distance from the camera 10. For example, in the area R2 of the detection area A1 where the rearward distance from the camera 10 is the distance D1 or greater and less than the distance D2, the gain in the first threshold value $\alpha_1$ is set to a fixed value. In contrast, in the area R1 of the detection area A1 where the rearward distance from the camera 10 is less than the distance D1, the gain is greater than the first threshold value $\alpha_1$ set in the area R2, and the higher the gain in the first threshold value $\alpha_1$ is, the shorter the rearward distance from the camera 10 is (the nearer to the host vehicle). Furthermore, in the area R3 as well of the detection area A1 where the rearward distance from the camera 10 is the distance D2 or greater, the gain is greater than the first threshold value $\alpha_1$ set in the area R2, and the greater rearward distance from the camera 10 (the farther from the host vehicle) is, the higher the gain in the first threshold value $\alpha_1$ is.

Figure 9A:
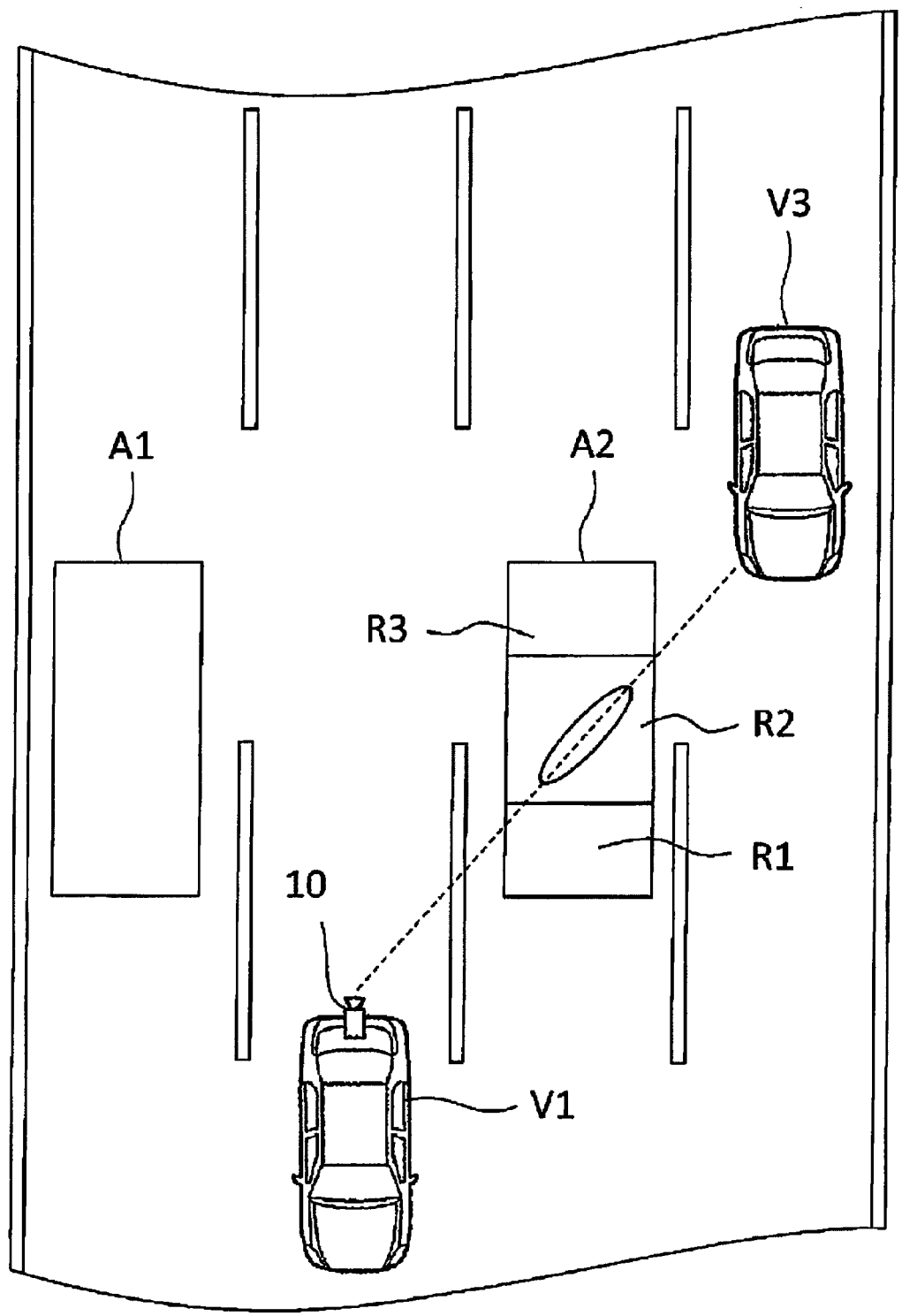
FIG. 9A is a view illustrating a situation in which light from the headlights of an adjacent-adjacent vehicle is shined into the area R2 in the detection areas A1, A2.

Here, FIG. 9A illustrates a situation in which headlights of an adjacent-adjacent vehicle V3 are detected in the area R2 in the detection areas A2. As illustrated in FIG. 9A, the light of the headlights of an adjacent-adjacent vehicle is shined directly into the camera 10 from an adjacent-adjacent lane in the area R2 of the detection area A2, and the amount of light from the headlights incident on the camera 10 is high. Therefore, the luminance in the area R2 is higher than in the other areas R1, R3 of the detection area A2. Accordingly, as illustrated in the drawing on the right in FIG. 8, the detection reference setting unit 35 can set the threshold value $\alpha$ higher in accordance with the higher luminance in the area R2, as illustrated in FIG. 7, even when the gain of the first threshold value $\alpha_1$ has been set to a lower value in the area R2 of the detection areas A1, A2 than in the other areas R1, R3 in the detection areas A1, A2, and it is therefore possible to effectively prevent the light of the headlights of the adjacent-adjacent vehicle V3 from being errantly detected as an adjacent vehicle. In FIG. 9A, only the detection area A2 is shown and described, but the same applies to the detection area A1 (and the same applies to the later-described FIG. 9B and FIG. 9C).

Figure 9B:
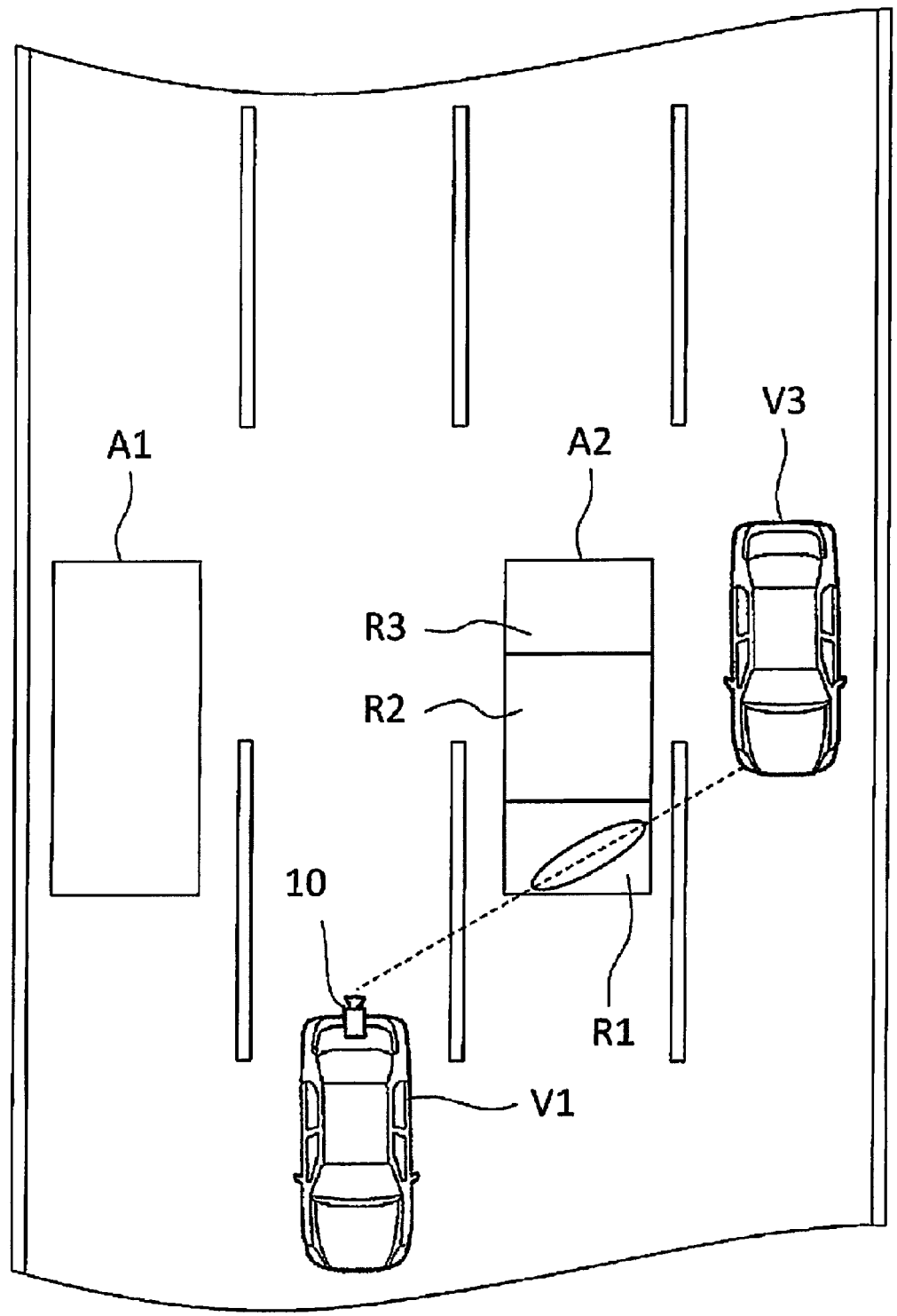
FIG. 9B is a view illustrating a situation in which light from the headlights of an adjacent-adjacent vehicle is shined into the area R1 in the detection areas A1, A2.

FIG. 9B illustrates a situation in which headlights of an adjacent-adjacent vehicle V3 are detected in the area R1 in the detection areas A2. As illustrated in FIG. 9B, of the light of the headlights shined from the adjacent-adjacent vehicle V3, only a portion of the light shined in the direction in which the host vehicle V1 is present enters the camera 10 when the headlights of the adjacent-adjacent vehicle V3 are detected in the area R1 near the host vehicle. Accordingly, the amount of light from the headlights incident on the camera 10 is ordinarily lower in the area R1 of the detection areas A1, A2 near the host vehicle than in the area R2 of the detection areas A1, A2, and the luminance of area R1 is low. Consequently, merely modifying the first threshold value $\alpha_1$ in accordance with the luminance results in cases in which the light of headlights of the adjacent-adjacent vehicle V3 shined into the area R1 is errantly detected as an adjacent vehicle, as illustrated in FIG. 7. In particular, the shorter the rearward distance is from the camera 10 in area R1 (nearer to the host vehicle), the weaker the light of the headlights shined from the adjacent-adjacent vehicle V3 will be. In contrast, in the present embodiment, the gain of the first threshold value $\alpha_1$ is set to be higher in the area R1 than in the area R2, and the gain of the first threshold value $\alpha_1$ is set to be higher in commensurate fashion to a shorter rearward distance from the camera 10 (nearer to the host vehicle), as illustrated in the drawing on the right in FIG. 8. Accordingly, in the present embodiment, the detection reference setting unit 35 can modify the threshold value $\alpha$ to a high value, even when the luminance of the headlights of the adjacent-adjacent vehicle V3 detected in the area R1 is low, and it is thereby possible to effectively prevent the light of the headlights of an adjacent-adjacent vehicle V3 from being errantly detected as an adjacent vehicle V2, even when the luminance of the headlights of the adjacent-adjacent vehicle V3 detected in the area R1 is low.

Figure 9C:
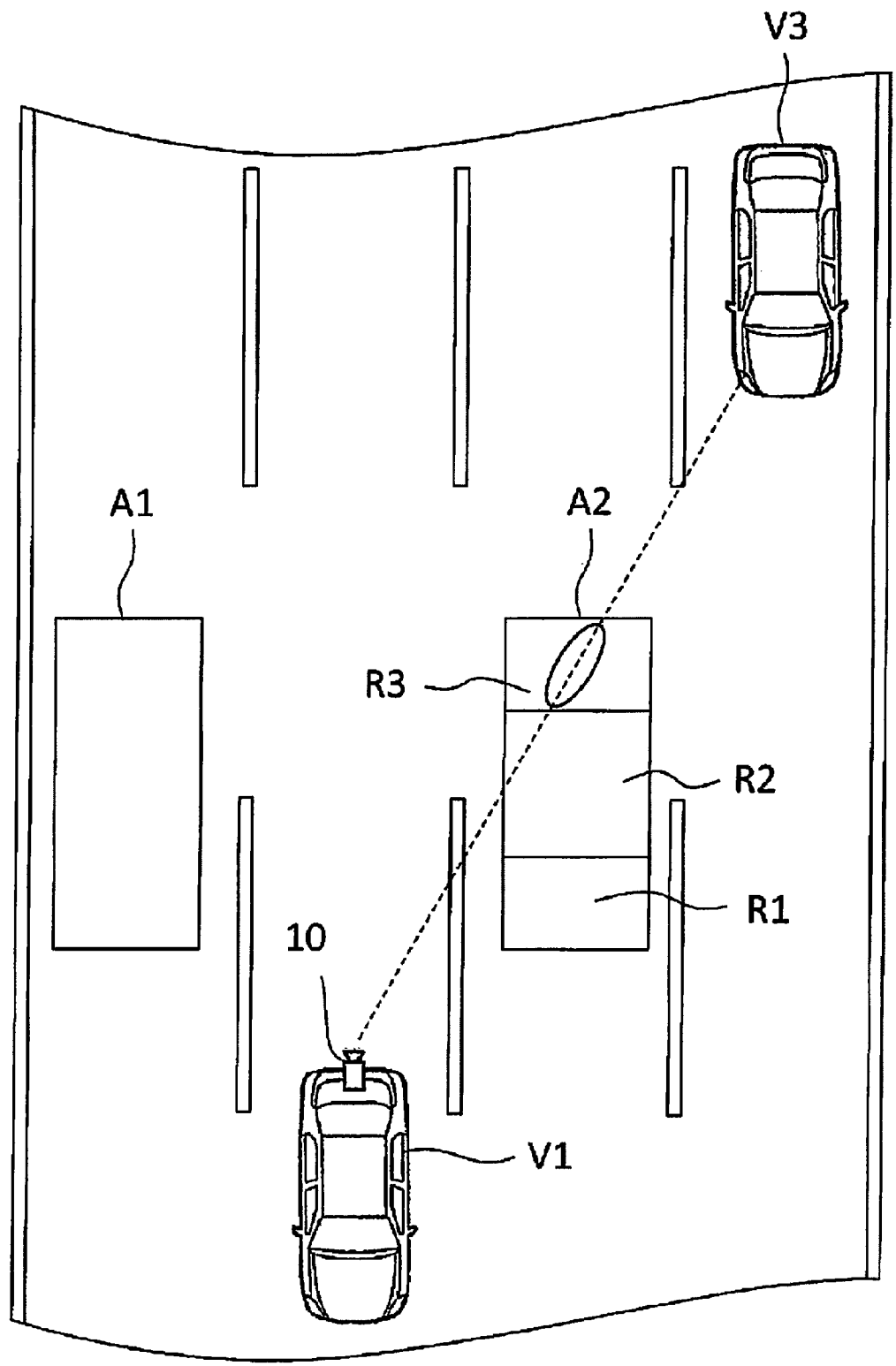
FIG. 9C is a view illustrating a situation in which light from the headlights of an adjacent-adjacent vehicle is shined into the area R3 in the detection areas A1, A2.

FIG. 9C illustrates a situation in which headlights of an adjacent-adjacent vehicle V3 are detected in the area R3 in the detection areas A2. As illustrated in FIG. 9B, lights having various luminance are shined from a plurality of vehicles positioned rearward from the detection areas A1, A2 (e.g., an adjacent-adjacent vehicle V3 and vehicles or the like present even farther rearward than the adjacent-adjacent vehicle V3) into the area R3 far from the host vehicle. In other words, the light of the headlights of the adjacent-adjacent vehicle V3 detected in the area R3 may have lower luminance than in area R2, and in such a case, merely modifying the first threshold value $\alpha_1$ in accordance with the luminance results in cases in which the light of headlights of the adjacent-adjacent vehicle V3 shined into the area R3 is errantly detected as an adjacent vehicle, as illustrated in FIG. 7. In particular, in area R3, the greater the rearward distance from the camera 10 (farther from the host vehicle) is, the greater the tendency is for the luminance of the light from the shined headlights to vary. In contrast, in the present embodiment, the gain of the first threshold value $\alpha_1$ is set to be higher in the area R3 in the same manner as the area R1 than in the area R2, and the gain of the first threshold value $\alpha_1$ is set to be higher in commensurate fashion to the greater rearward distance from the camera 10 (farther from the host vehicle), as illustrated in the drawing on the right in FIG. 8. Accordingly, in the present embodiment, the detection reference setting unit 35 can modify the first threshold value $\alpha_1$ to a high value, even when the luminance of the headlights of the adjacent-adjacent vehicle V3 detected in the area R3 is low, and it is thereby possible to effectively prevent the light of the headlights of an adjacent-adjacent vehicle V3 from being errantly detected as an adjacent vehicle V2, even when the luminance of the headlights of the adjacent-adjacent vehicle V3 detected in the area R1 is low.

In this manner, the detection reference setting unit 35 sets the first threshold value $\alpha_1$ in accordance with the luminance in the detection positions in the detection areas A1, A2, as illustrated in FIG. 7, and modifies the gain of the set first threshold value $\alpha_1$ in accordance with the rearward distance from the camera 10, as illustrated in FIG. 8, to thereby set a first threshold value $\alpha_1$ that corresponds to the detection positions in the detection areas A1, A2, as illustrated in FIG. 6. For example, the detection reference setting unit 35 refers to FIG. 7 and sets the first threshold value $\alpha_1$ in accordance with the luminance of the difference pixels DP on the line La illustrated in the drawing on the left in FIG. 5, and furthermore modifies the set first threshold value $\alpha_1$ using the gain of the first threshold value $\alpha_1$ in the position of the crossing point CP of the line La among the gain of the first threshold value $\alpha_1$ illustrated in the drawing on the right in FIG. 8 to thereby calculate the first threshold value $\alpha_1$ of the position corresponding to the line La. Similarly, the detection reference setting unit 35 calculates the first threshold value $\alpha_1$ of the position corresponding to the lines Lb, Lc, . . . to thereby set a first threshold value $\alpha_1$ that corresponds to the detection positions in the detection areas A1, A2, as illustrated in FIG. 6.

The detection reference setting unit 35 also sets the threshold value $\alpha$ so that an image of the light from the headlights of the adjacent-adjacent vehicle V3 shined into the adjacent lane can be prevented from being errantly detected as an adjacent vehicle. Accordingly, in the present embodiment, the processing for modifying the first threshold value $\alpha_1$ in accordance with the rearward distance from the camera 10 may be configured so as to be carried out only under a condition (e.g., nighttime) in which the headlights of the adjacent-adjacent vehicle V3 are on. The detection reference setting unit 35 can, e.g., determine that the condition (e.g., nighttime) in which the headlights of the adjacent-adjacent vehicle V3 are on is when the luminance of the image captured by the camera 10 is at a predetermined value or less.

Figure 10:
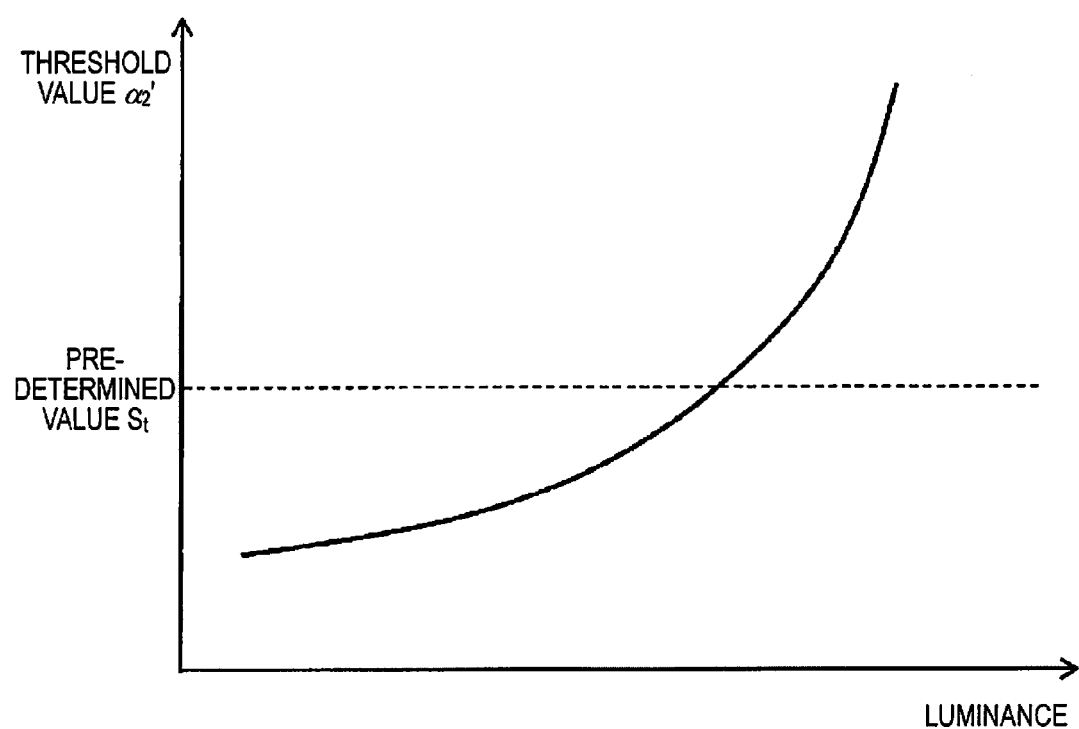
FIG. 10 is a graph illustrating an example of the first threshold value map for illustrating the relationship between the luminance in the detection positions in the detection areas A1, A2 and the threshold value $\alpha_2$.
Figure 11:
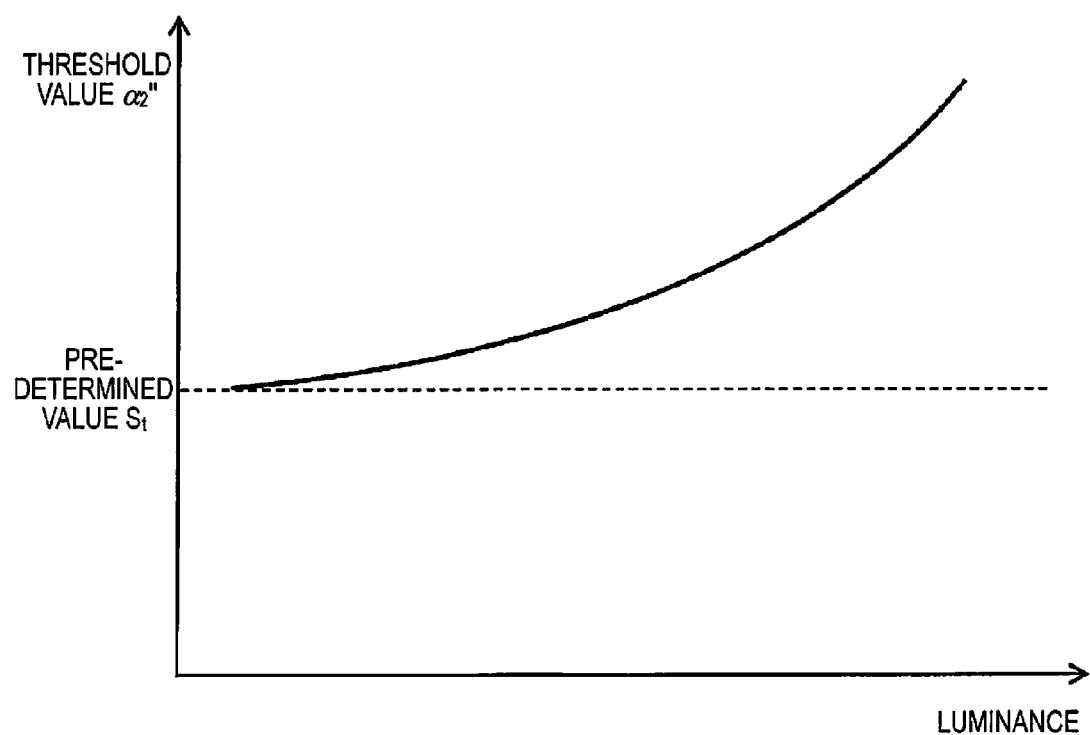
FIG. 11 is a view illustrating an example of the second threshold value map for illustrating the relationship between the luminance in the detection positions in the detection areas A1, A2 and the threshold value $\alpha_2$.

Described next is the method for setting the second threshold value $\alpha_2$ that corresponds to the positional relationship between the camera 10 and the light source. In the present embodiment, the detection reference setting unit 35 is provided with: a first threshold value map indicating the relationship between the luminance in the detection positions in the detection areas A1, A2 and a predetermined threshold value $\alpha_2'$, as illustrated in FIG. 10; and a second threshold value map indicating the relationship between the luminance in the detection positions in the detection areas A1, A2 and a predetermined threshold value $\alpha_2''$, as illustrated in FIG. 11. The first threshold value map illustrated in FIG. 10 is set so that the threshold value $\alpha_2'$ is a relatively low value when the luminance is relatively low, so that the tire/wheel, which is a characteristic portion of an adjacent vehicle, is readily detected when an adjacent vehicle is to be detected. On the other hand, the second threshold value map illustrated in FIG. 11 is set so that the threshold value $\alpha_2''$ is a relatively high value even when the luminance is relatively low so that an adjacent vehicle is not errantly detected in the vicinity of the detected headlights, e.g., even when the light of the headlights from an adjacent-adjacent vehicle (a vehicle present in an adjacent-adjacent lane two lanes adjacent to the host vehicle lane) has been detected in the detection areas A1, A2. Specifically, the threshold value $\alpha_2''$ specified in the second threshold value map illustrated in FIG. 11 is set so as to be greater than a predetermined value $S_t$, even when the luminance is low, in comparison with the threshold value $\alpha_2'$ specified in the first threshold value map illustrated in FIG. 10.

The detection reference setting unit 35 then calculates the second threshold value $\alpha_2$ for detecting an adjacent vehicle in the detection positions in the detection areas A1, A2 in accordance with formula 1 noted below using: the threshold value $\alpha_2'$ obtained from the first threshold value map illustrated in FIG. 10 in accordance with the luminance in the detection positions in the detection areas A1, A2; and the threshold value $\alpha_2''$ obtained from the second threshold value map illustrated in FIG. 11 in accordance with the luminance in the detection positions in the detection areas A1, A2.

Second threshold value $\alpha_2=\{(1-wt)\cdot(\text{threshold value } \alpha_2' \text{ obtained from the first threshold value map})+(wt\cdot\text{threshold value } \alpha_2'' \text{ obtained from the second threshold value map})\}$       Formula 1

Figure 12:
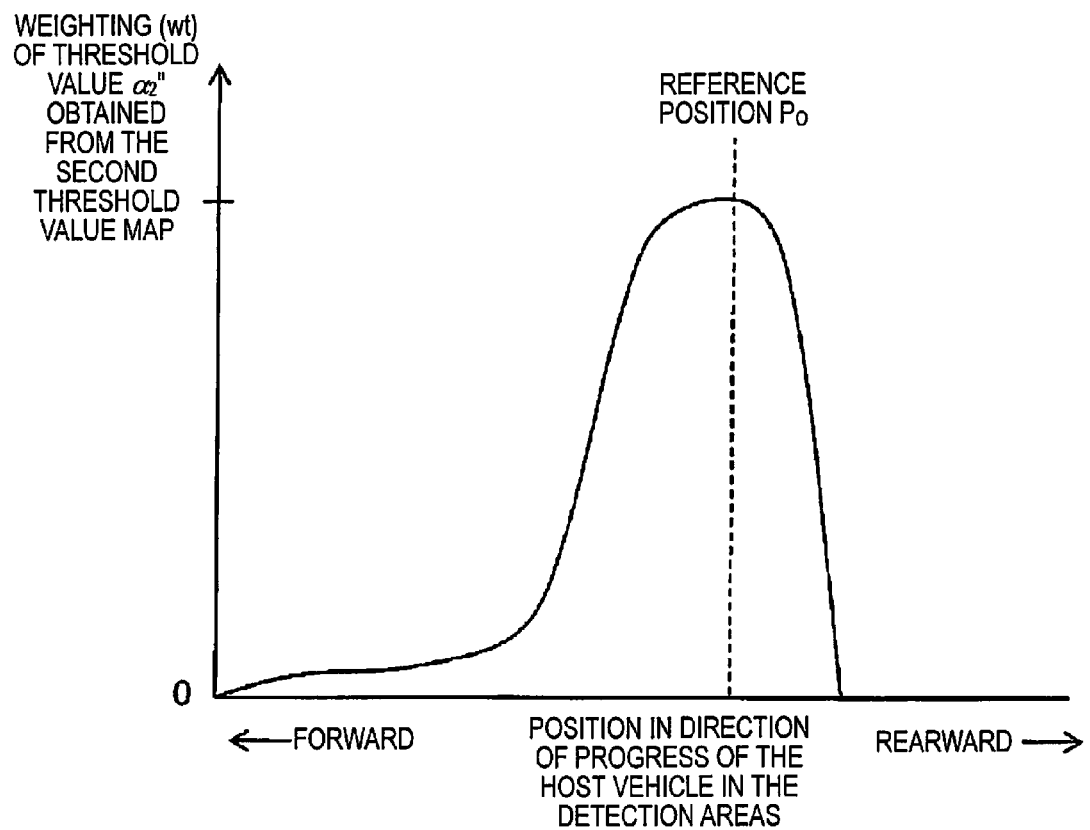
FIG. 12 is a view illustrating an example of the control map in which the weighting wt of the threshold value $\alpha_2$" obtained from the second threshold value map has been specified.

In formula 1, wt is the weighting of the threshold value $\alpha_2''$ obtained from the second threshold value map (a map that places emphasis on preventing errant detection in the vicinity of the headlights), and the weighting wt is decided based on a control map illustrated in FIG. 12.

Here, FIG. 12 is an example of the control map in which the weighting wt of the threshold value $\alpha_2''$ obtained from the second threshold value map has been specified. In the control map illustrated in FIG. 12, the vertical axis indicates the weighting wt of the threshold value $\alpha_2''$ obtained from the second threshold value map, and the horizontal axis indicates the position of the detection positions in the direction of progress of the host vehicle. In the control map illustrated in FIG. 12, the weighting wt is a maximum of "1" in a later-described reference position $P_O$. Accordingly, when the second threshold value $\alpha_2$ has been calculated in accordance with formula 1 noted above, the second threshold value $\alpha_2$ in the reference position $P_O$ is equal to the threshold value $\alpha_2''$ obtained from the second threshold value map in which emphasis is placed on preventing errant detection in the vicinity of headlights. Also, in the control map illustrated in FIG. 12, the weighting wt is a value near "1" in the near the reference position $P_O$. Accordingly, when the second threshold value $\alpha_2$ has been calculated in accordance with formula 1 noted above, the second threshold value $\alpha_2$ in the reference position $P_O$ is equal to the second threshold value $\alpha_2$ near the reference position $P_O$ is a value near the threshold value $\alpha_2''$ obtained from the second threshold value map.

In the control map illustrated in FIG. 12, the weighting wt is "0" in positions slightly set at a distance from the reference position $P_O$ rearward of the reference position $P_O$ in comparison with forward of the reference position $P_O$. Accordingly, when the second threshold value $\alpha_2$ has been calculated in accordance with formula 1 noted above, the second threshold value $\alpha_2$ rearward of the reference position $P_O$ is equal to the threshold value $\alpha_2'$ obtained from the first threshold value map, in which the tire/wheel of the adjacent vehicle is readily detected. Conversely, the weighting wt of the threshold value $\alpha_2$ obtained from the second threshold value map changes to a high value forward of the reference position $P_O$. Accordingly, when the second threshold value $\alpha_2$ has been calculated in accordance with formula 1 noted above, the threshold value $\alpha_2''$, which places emphasis on prevention of errant detection in the vicinity of the headlights forward of the reference position $P_O$ in comparison with rearward of the reference position $P_O$, is calculated.

Furthermore, in the present embodiment, the detection reference setting unit 35 adjusts the control map illustrated in FIG. 12 in accordance with the positional relationship between the camera 10 and the light source prior to calculating the second threshold value $\alpha_2$ for detecting an adjacent vehicle using the control map illustrated in FIG. 12. Described below is the method for adjusting the control map illustrated in FIG. 12 with reference to FIG. 13. Here, FIG. 13 is a view for describing the method for adjusting the control map illustrated in FIG. 12.

Figure 13:
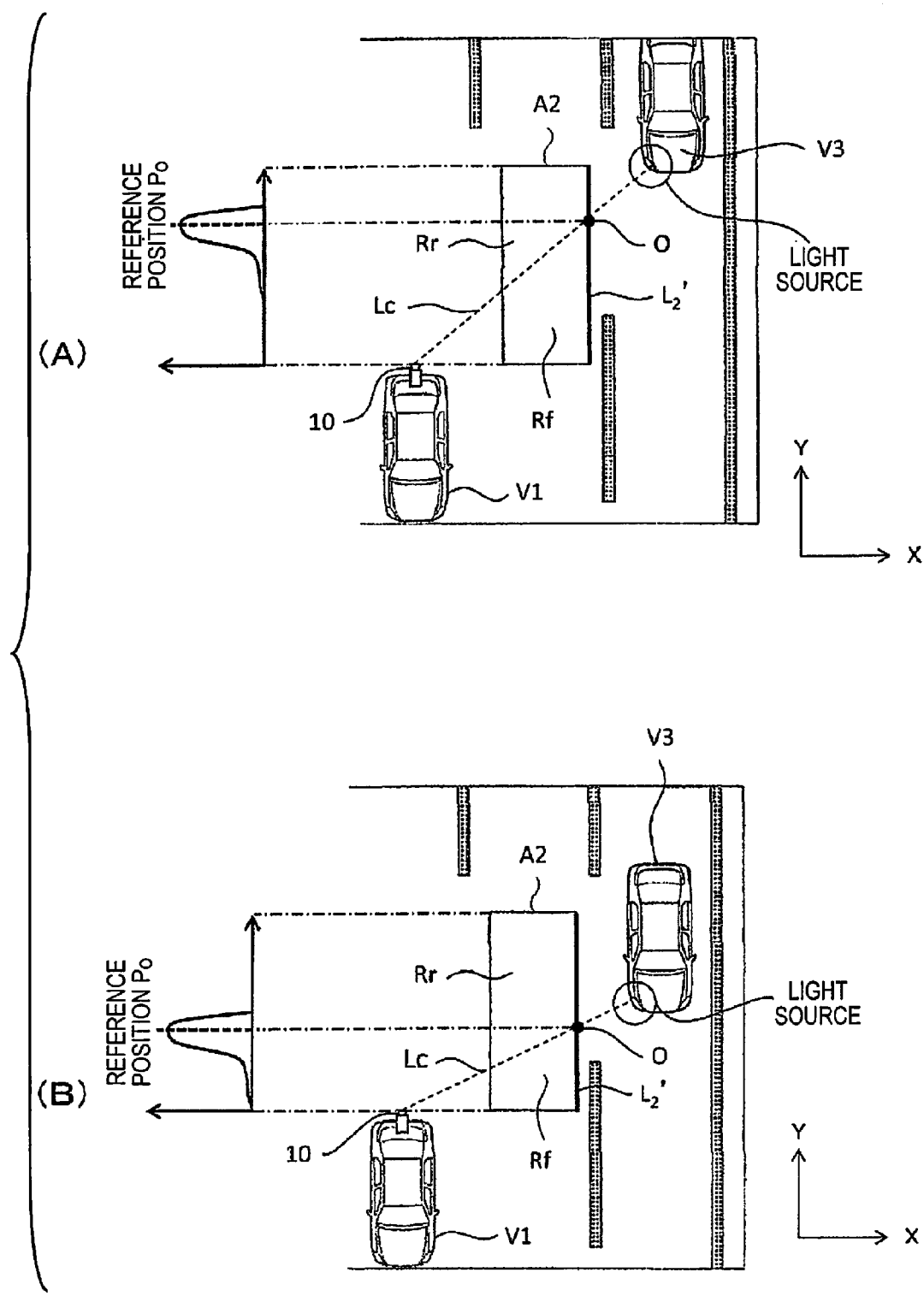
FIG. 13 is a view describing the method for adjusting the control map illustrated in FIG. 12.

In other words, the detection reference setting unit 35 detects the headlights of an adjacent-adjacent vehicle V3 or other light sources from a captured image captured by the camera 10, as illustrated in the drawing on the right in part (A) of FIG. 13. The detection reference setting unit 35 then detects the centroid position of the detected light source, and sets a line Lc that passes through the centroid position of the light source and the center position of the camera 10. Furthermore, the detection reference setting unit 35 calculates the crossing point O between the line Lc and the side (side along the travel direction) L2' of the adjacent-adjacent lane-side of the detection area A2. The method for detecting a light source carried out by the detection reference setting unit 35 is later described.

The detection reference setting unit 35 adjusts the control map illustrated in FIG. 12 so that the crossing point O and the reference position $P_O$ of the control map illustrated in FIG. 12 match each other. Here, part (B) of FIG. 13 gives an example of a situation in which the adjacent-adjacent vehicle V3 has approached the host vehicle V1 from the situation illustrated in part (A) of FIG. 13. In the situation illustrated in part (B) of FIG. 13, the adjacent-adjacent vehicle V3 has approached the host vehicle V1, and the crossing point O between the line Lc, and the line L2' in the detection area A2 has therefore moved further forward (negative Y-axis direction) of the crossing point O illustrated in part (A) of FIG. 13. Accordingly, the control map illustrated in FIG. 12 is adjusted by the detection reference setting unit 35 so that the position of the crossing point O illustrated in the drawing on the right in part (B) of FIG. 13 matches the reference position $P_O$ of the control map illustrated in FIG. 12, as illustrated in the drawing on the left in part (B) of FIG. 13, whereby the control map illustrated in FIG. 12 is shifted forward (negative Y-axis direction) overall, as illustrated in the drawing on the right in part (B) of FIG. 13, in comparison with the control map illustrated in the drawing on the left in part (A) of FIG. 13, and the position of the light source and the reference position $P_O$ of the control map as illustrated in FIG. 12 thereby correspond.

In this manner, the position of the light source and the reference position $P_O$ of the control map as illustrated in FIG. 12 are made to correspond, whereby the weighting wt of the second threshold value $\alpha_2''$ obtained from the second threshold value map can be increased in the area Rf further forward of the light source (i.e., the area in which Y<kX, where 0 is the position of the camera 10 in the Y direction, Y>0 is rearward of the camera 10, and Y=kX is the line Lc). Accordingly, when the second threshold value $\alpha_2$ has been calculated in accordance with formula 1 noted above, the second threshold value $\alpha_2$, in which emphasis is placed on preventing errant detection in the vicinity of headlights, is obtained in the area further forward from the light source.

On the other hand, causing the position of the light source and the reference position $P_O$ of the control map as illustrated in FIG. 12 to correspond allows the weighting wt of the second threshold value $\alpha_2''$ obtained from the second threshold value map to be increased in the area Rr further rearward of the light source (i.e., the area in which Y≥kX, where the Y direction is the direction of progress of the host vehicle and the X direction is the vehicle width direction in an XY plane, 0 is the position of the camera 10 in the Y direction, Y>0 is rearward of the camera 10, and Y=kX is the line Lc). Accordingly, when the second threshold value $\alpha_2$ has been calculated in accordance with formula 1 noted above, the second threshold value $\alpha_2$, in which the tire/wheel of an adjacent vehicle is readily detected, is obtained in the area further rearward from the light source.

The detection reference setting unit 35 modifies the second threshold value $\alpha_2$ in order to effectively prevent the light of headlights of an adjacent-adjacent vehicle shined into the adjacent lane from being errantly detected as an adjacent vehicle. Accordingly, in the present embodiment, it is possible to use a configuration in which modification of the second threshold value $\alpha_2$ by the detection reference setting unit 35 is carried out only at nighttime when the headlights of an adjacent-adjacent vehicle are on. The detection reference setting unit 35 may determine that it is nighttime when, e.g., the luminance of an image captured by the camera 10 is at a predetermined value or less.

In this manner, the detection reference setting unit 35 is capable of setting the first threshold value $\alpha_1$ set in accordance with the rearward distance from the camera 10 and the second threshold value $\alpha_2$ set in accordance with the positional relationship between the camera 10 and the light source. The detection reference setting unit 35 determines whether the degree of certainty assessed by the degree-of-certainty assessment unit 34 is at a predetermined value or greater, and when the degree of certainty is less than the predetermined value, the first threshold value $\alpha_1$ is set as the threshold value $\alpha$ for detecting an adjacent vehicle based on the difference waveform $DW_t$, and on the other hand, when the degree of certainty is at the predetermined or greater, the second threshold value $\alpha_2$ is set as the threshold value $\alpha$ for detecting an adjacent vehicle based on the difference waveform $DW_t$.

Next, a description of the three-dimensional object detection unit 33 will be continued. After a three-dimensional object present in an adjacent lane has been detected, the three-dimensional object detection unit 33 calculates the movement distance of the three-dimensional object present in the adjacent lane by comparing the difference waveform $DW_t$ at the current moment and the difference waveform $DW_{t-1}$ at a single moment prior. In other words, the three-dimensional object detection unit 33 calculates the movement distance from the change in time of the difference waveforms $DW_t$, $DW_{t-1}$.

Figure 14:
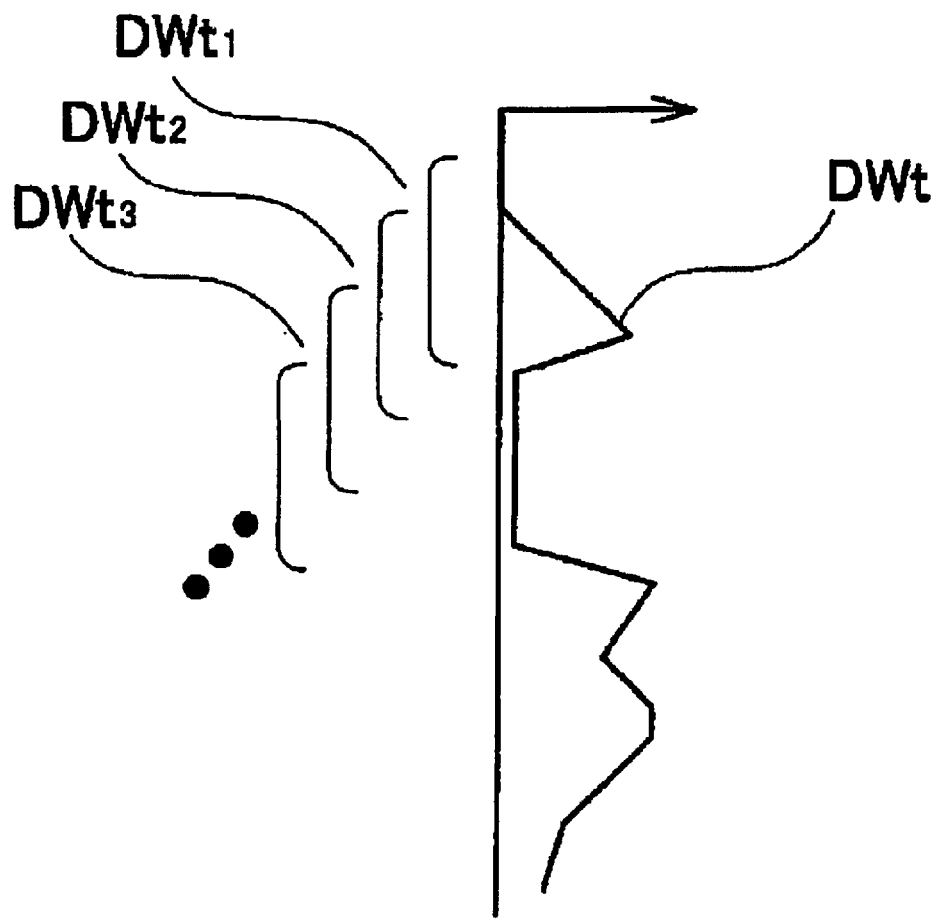
FIG. 14 is a view describing the small areas divided by the three-dimensional object detection unit according to the first embodiment.

More specifically, the three-dimensional object detection unit 33 divides the difference waveform $DW_t$ into a plurality of small areas $DW_{t1}$ to $DW_{tn}$ (where n is an arbitrary integer of 2 or greater), as illustrated in FIG. 14. FIG. 14 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, e.g., FIG. 14. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 14) of the difference waveform) for each of the small areas $DW_{t1}$ to $DW_{tn}$. Here, the offset amount is determined from the difference (distance in the horizontal-axis direction) between the difference waveform $DW_{t-1}$ at a single moment prior and the difference waveform $DW_t$ at the current moment. In this case, the three-dimensional object detection unit 33 moves the difference waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the difference waveform $DW_t$ at the current moment is at a minimum, and determines as the offset amount the movement amount in the horizontal-axis direction at the position in which the error from the original position of the difference waveform $DW_{t-1}$ is at a minimum. The three-dimensional object detection unit 33 then counts the offset amount determined for each of the small areas $DW_{t1}$ to $DW_{tn}$ and forms a histogram.

Figure 15:
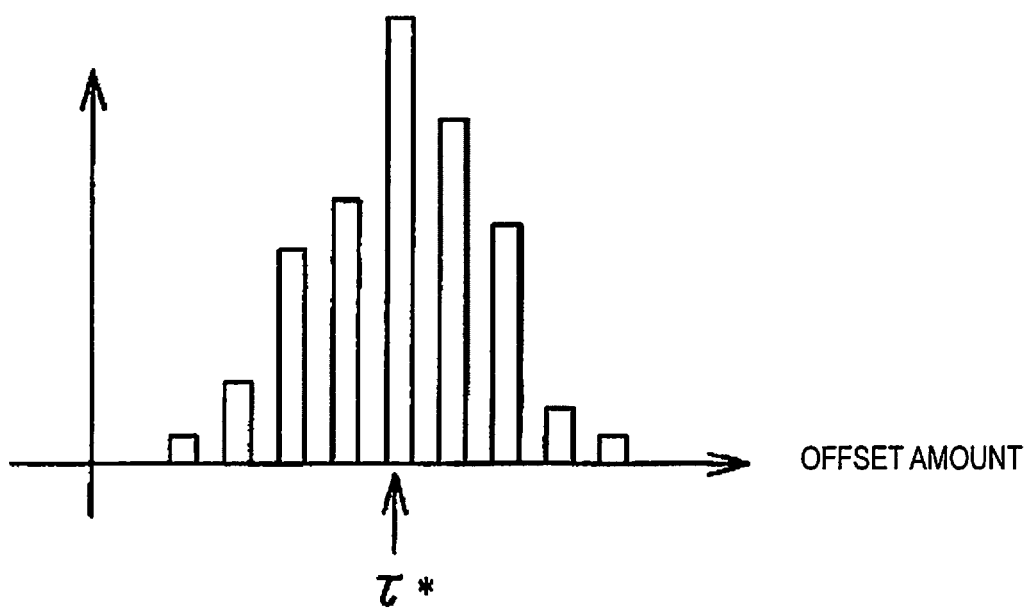
FIG. 15 is a view illustrating an example of the histogram obtained by the three-dimensional object detection unit according to the first embodiment.

FIG. 15 is a view illustrating an example of the histogram obtained by the three-dimensional object detection unit 33. As illustrated in FIG. 15, some amount of variability occurs in the offset amount, which is the movement distance in which the error between the small areas $DW_{t1}$ to $DW_{tn}$ and the difference waveform $DW_{t-1}$ at a single moment prior is at a minimum. Accordingly, the three-dimensional object detection unit 33 forms the offset amounts including the variability into a histogram and calculates the movement distance from the histogram. At this point, the three-dimensional object detection unit 33 calculates the movement distance of the three-dimensional object from the maximum value in the histogram. In other words, in the example illustrated in FIG. 15, the three-dimensional object detection unit 33 calculates the offset amount indicating the maximum value of the histogram as the movement distance $\tau^*$. In this manner, in the present embodiment, a more highly accurate movement distance can be calculated from the maximum value, even when there is variability in the offset amount. The movement distance $\tau^*$ is the relative movement distance of the three-dimensional object in relation to the host vehicle. Accordingly, the three-dimensional object detection unit 33 calculates the absolute movement distance based on the movement distance τ* thus obtained and the speed sensor 20 when the absolute movement distance is to be calculated.

In this manner, in the present embodiment, the movement distance of the three-dimensional object is calculated from the offset amount of the difference waveform $DW_t$ when the error in the difference waveform $DW_t$ generated at different moments is at a minimum, and this allows the movement distance to be calculated from the offset amount, which is information about one dimension in a waveform, and allows computation cost to be kept low when the movement distance is calculated. Also, dividing the difference waveform $DW_t$ generated at different moments into a plurality of small areas $DW_{t1}$ to $DW_{tn}$ allows a plurality of waveforms representing the locations of the three-dimensional object to be obtained, thereby allowing the offset amount at each location of the three-dimensional object to be determined and allowing the movement distance to be determined from a plurality of offset amounts. Therefore, precision of calculating the movement distance can be improved. In the present embodiment, the movement distance of the three-dimensional object is calculated from the change in time of the difference waveform $DW_t$, which includes height direction information. Consequently, in contrast to the focus being solely on the movement of a single point, the detection location prior to change in time and the detection location after change in time are specified with height direction information included and accordingly readily end up being the same location; the movement distance is calculated from the change in time at the same location; and the precision for calculating the movement distance can be improved.

Figure 16:
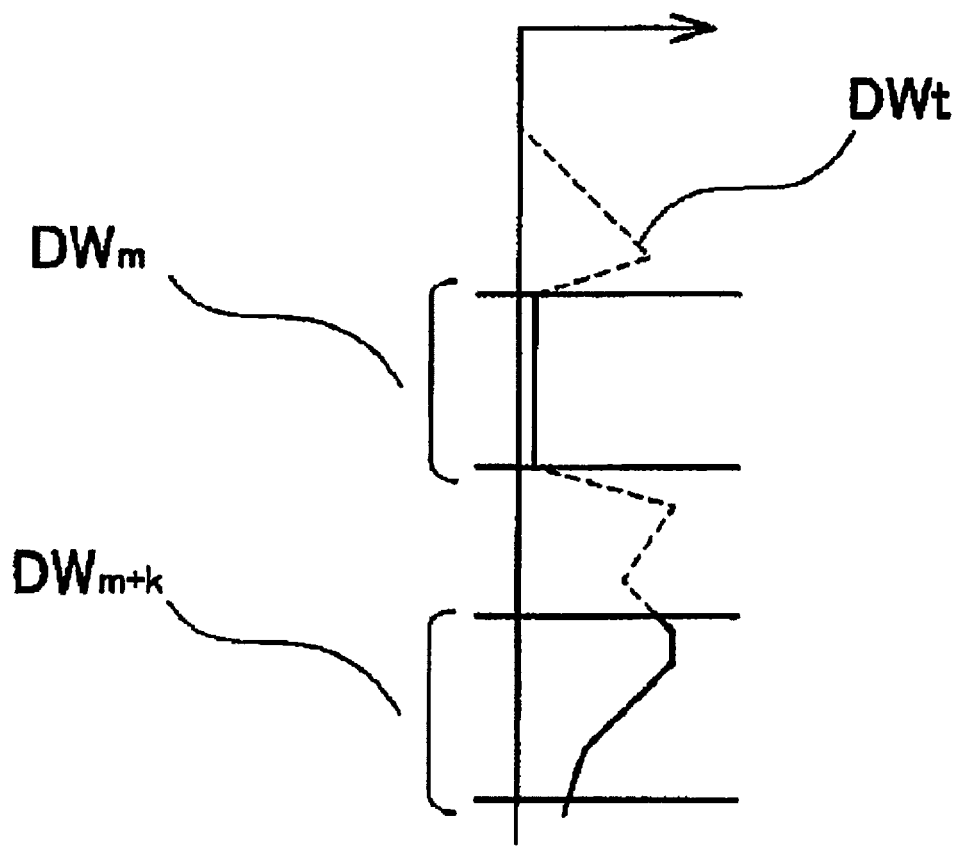
FIG. 16 is a view illustrating the weighting used by the three-dimensional object detection unit according to the first embodiment.

When a histogram is to be formed, the three-dimensional object detection unit 33 may impart a weighting to the plurality of small areas $DW_{t1}$ to $DW_{tn}$, and count the offset amounts determined for each of the small areas $DW_{t1}$ to $DW_{tn}$ in accordance with the weighting to form a histogram. FIG. 16 is a view illustrating the weighting used by the three-dimensional object detection unit 33.

As illustrated in FIG. 16, a small area $DW_m$ (where m is an integer 1 or greater and n−1 or less) is flat. In other words, in the small area $DW_m$, there is little difference between the maximum and minimum values of the count of number of pixels indicating a predetermined difference. The three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer n−m or less) has abundant undulation. In other words, in the small area $DW_{m+k}$, there is considerable difference between the maximum and minimum values of the count of number of pixels indicating a predetermined difference. The three-dimensional object detection unit 33 increases the weighting of this type of small area $DW_{m+k}$. This is because the small area $DW_{m+k}$ abundant in undulation is characteristic and there is a high possibility that the offset amount will be accurately calculated. Weighting the small areas in this manner makes it possible to enhance the precision for calculating the movement distance.

The difference waveform $DW_t$ is divided into a plurality of small areas $DW1_{t1}$ to $DW_{tn}$ in the present embodiment in order to enhance the precision for calculating the movement distance, but division into the small areas $DW_{t1}$ to $DW_{tn}$ is not required when the precision for calculating movement distance is not so needed. In this case, the three-dimensional object detection unit 33 calculates the movement distance from the offset amount of the difference waveform $DW_t$ when the error between the difference waveform $DW_t$ and the difference waveform $DW_{tn}$ is at a minimum. In other words, the method for determining the offset amount between the difference waveform $DW_{t-1}$ at a single moment prior and the difference waveform $DW_t$ at the current moment is not limited to the details described above.

The three-dimensional object detection unit 33 in the present embodiment determines the movement speed of the host vehicle V1 (camera 10) and determines the offset amount for a stationary object from the determined movement speed. After the offset amount of the stationary object has been determined, the three-dimensional object detection unit 33 ignores the offset amount that corresponds to the stationary object within the maximum value of the histogram, and calculates the movement distance of the three-dimensional object.

Figure 17:
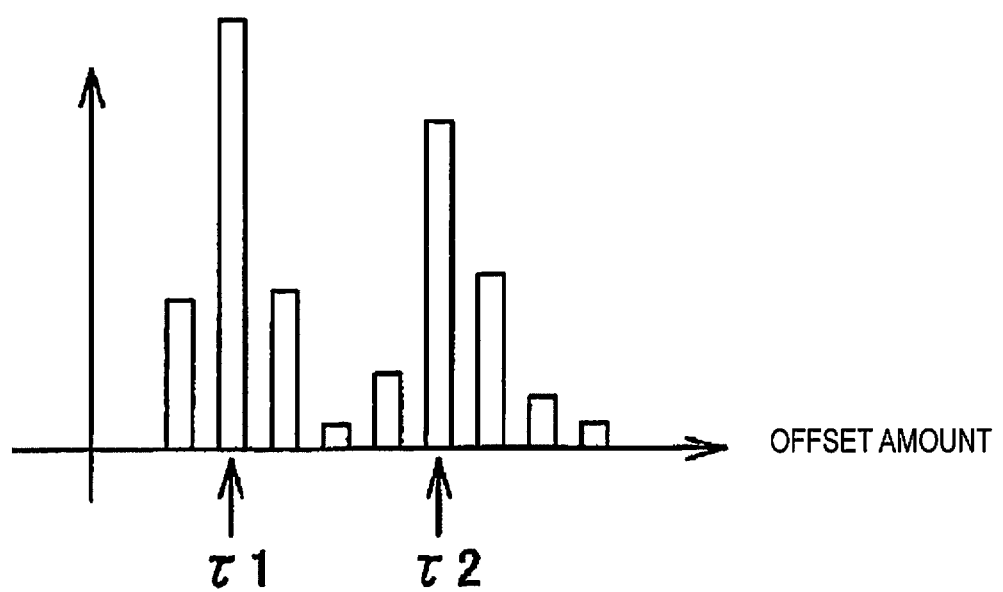
FIG. 17 is a view illustrating another example of the histogram obtained by the three-dimensional object detection unit according to the first embodiment.

FIG. 17 is a view illustrating another example of the histogram obtained by the three-dimensional object detection unit 33. When a stationary object other than the three-dimensional object is present within the view angle of the camera 10, two maximum values τ1, τ2 appear in the resulting histogram. In this case, one of the two maximum values τ1, τ2 is the offset amount of the stationary object. Consequently, the three-dimensional object detection unit 33 determines the offset amount for the stationary object from the movement speed, ignores the maximum value that corresponds to the offset amount, and calculates the movement distance of the three-dimensional object using the remaining maximum value. It is thereby possible to prevent a situation in which the precision for calculating the movement distance of the three-dimensional object is reduced by the stationary object.

Even when the offset amount corresponding to the stationary object is ignored, there may be a plurality of three-dimensional objects present within the view angle of the camera 10 when there is a plurality of maximum values. However, a plurality of three-dimensional objects present within the detection areas A1, A2 occurs very rarely. Accordingly, the three-dimensional object detection unit 33 stops calculating the movement distance. In the present embodiment, it is thereby possible to prevent a situation in which an errant movement distance is calculated such as when there is a plurality of maximum values.

Figure 18:
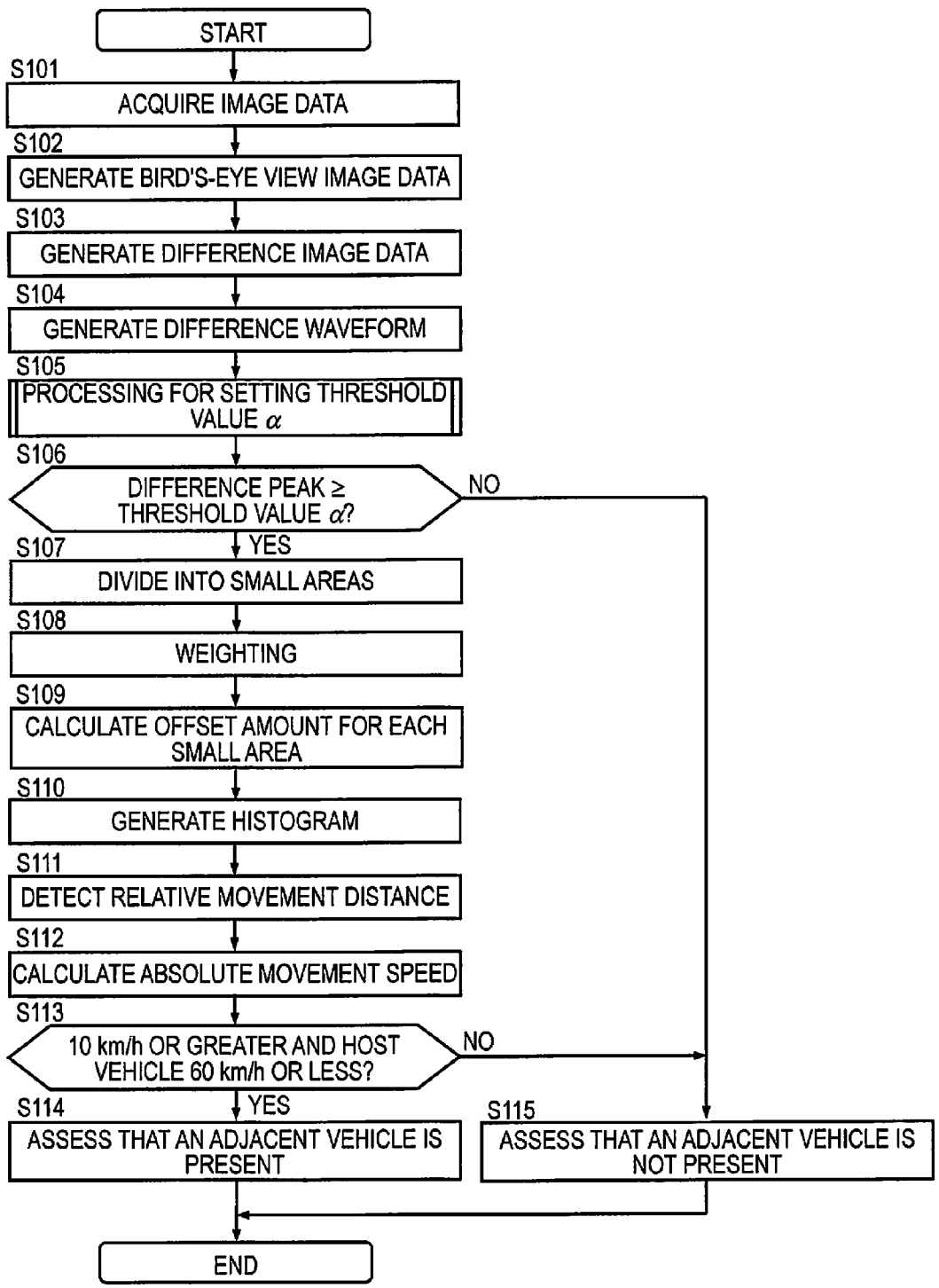
FIG. 18 is a flowchart illustrating the method for detecting an adjacent vehicle according to the first embodiment.

Described next is the process for detecting an adjacent vehicle in accordance with the present embodiment. FIG. 18 is a flowchart illustrating processes for detecting an adjacent vehicle according to the present embodiment. First, data of a captured image P is acquired by the computer 30 from the camera 10 (step S101), and data of a bird's-eye view image $PB_t$ is generated (step S102) by the viewpoint conversion unit 31 based on the data of the captured image P thus acquired, as illustrated in FIG. 12.

The alignment unit 32 aligns the bird's-eye view image $PB_t$ data and the bird's-eye view image $PB_{t-1}$ data at a single moment prior, and generates difference image $PD_t$ data (step S103). The three-dimensional object detection unit 33 then counts the number of difference pixels DP having a pixel value of "1" to thereby generate a first difference waveform $DW_t$ from the difference image $PD_t$ data (step S104).

Figure 19:
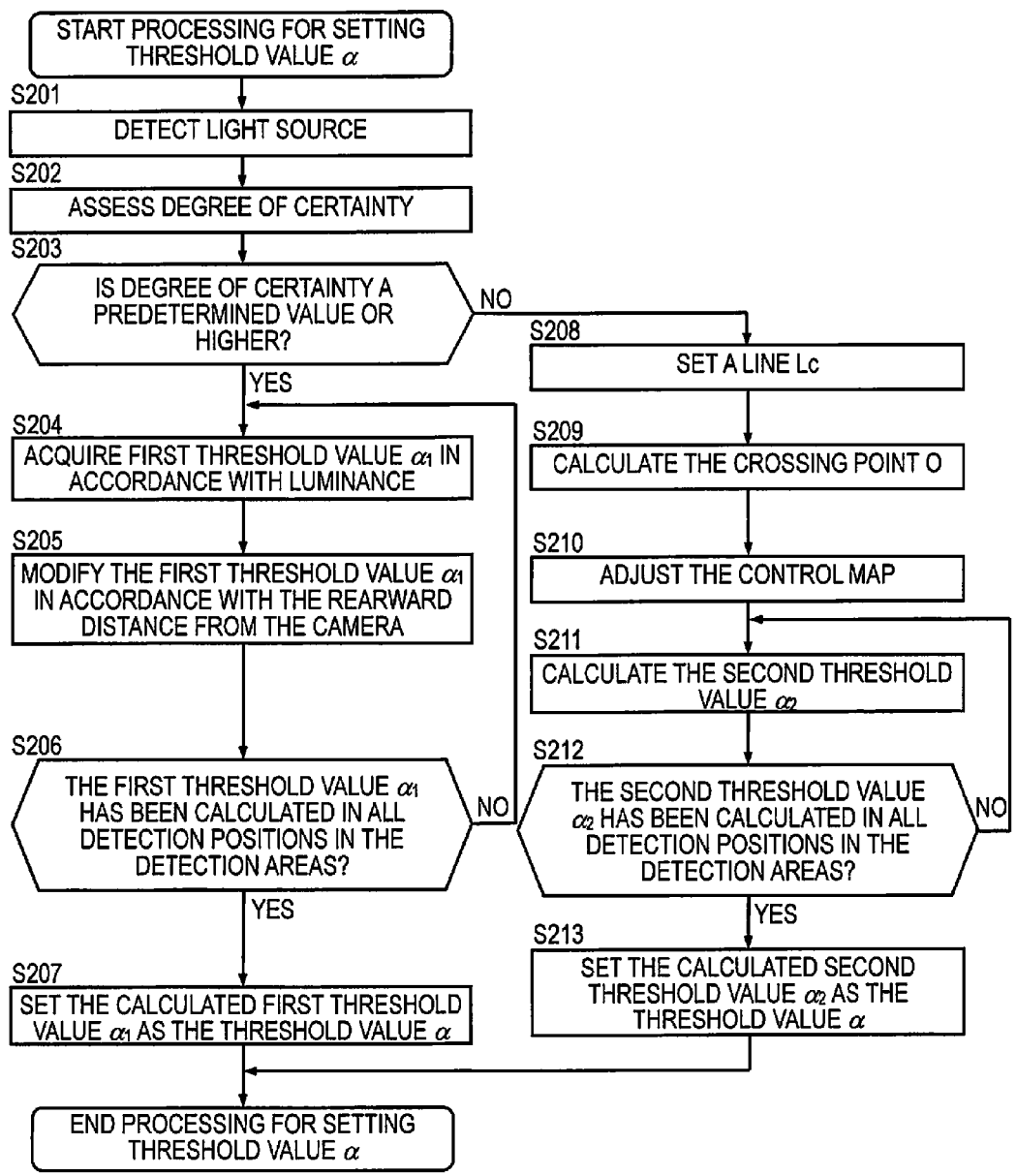
FIG. 19 is a flowchart illustrating the process for setting the threshold value α of step S105.

The detection reference setting unit 35 sets the threshold value α for detecting an adjacent vehicle based on the difference waveform $DW_t$ (step S105). Here, FIG. 19 is a flowchart illustrating the process for setting the threshold value α of step S105. The detection reference setting unit 35 first detects the headlights of an adjacent-adjacent vehicle or other light source from the captured image captured by the camera 10 (step S201), as illustrated in FIG. 19.

Here, the detection reference setting unit 35 detects an image area of the captured image having a size of a predetermined value $s_l$ or greater and in which the difference in brightness with the surroundings is at a predetermined value $s_d$ or greater in order to eliminate the effect of noise and suitably detect the headlights of another vehicle as a light source.

Accordingly, the detection reference setting unit 35 first subjects the captured image to edge processing and detects areas in which the difference in brightness from the surroundings is at the predetermined value $s_d$ or greater, these areas being light source candidates. In the present embodiment, the detection reference setting unit 35 is not limited to the predetermined value $s_d$ being a fixed value, and is capable of modifying the predetermined value $s_d$ based on, e.g., the rearward distance from the camera 10 to the light source candidate, or the luminance of the area in which the light source candidate is present, in order to suitably detect a light source. For example, the detection reference setting unit 35 can have a threshold value map in which the predetermined value $s_d$ is set in accordance with the luminance and a threshold value map in which the predetermined value $s_d$ is set in accordance with the rearward distance from the camera 10 to the light source candidate, compare the two threshold value maps, and select the higher predetermined value $s_d$ among the predetermined value $s_d$ obtained from these threshold value maps as the predetermined value $s_d$ for detecting the light source candidate.

The detection reference setting unit 35 then detects as the area corresponding to the light source the image area having a size of a predetermined value $s_l$ or greater among the detected light source candidates. The predetermined value sl is also not limited to being a fixed value, and the detection reference setting unit 35 may modify the predetermined value sl in accordance with, e.g., the rearward distance from the camera 10 to the light source candidate. For example, when the length of the detection areas A1, A2 in the direction of progress of the host vehicle is 10 m, the detection reference setting unit 35 divides the detection areas A1, A2 into three areas, beginning from the position in the detection areas A1, A2 nearest to the camera 10: an area R1, which is 0 to 1.5 m in the direction of progress of the host vehicle; an area R2, which is 1.5 to 6 m; and an area R3, which is 6 m to 10 m. The detection reference setting unit 35 detects an image area in which the length and breadth is, e.g., 5×5 pixels or greater as the area corresponding to the light source in area R1 nearest to the host vehicle and area R3 farthest from the host vehicle in the detection areas A1, A2, and detects an image area in which the length and breadth is, e.g., 7×7 pixels or greater as the area corresponding to the light source in area R2 in the center of the detection areas A1, A2.

When a light source could not be detected in step S201, the detection reference setting unit 35 sets the threshold value α to be, e.g., a threshold value set in advance, and ends the process for setting the threshold value α of step S105.

Next, the degree of certainty that a detected light source is the headlights of an adjacent-adjacent vehicle to the rear and side of the host vehicle (step S202) is assessed by the degree-of-certainty assessment unit 34. As described above, the degree-of-certainty assessment unit 34 comprehensively assesses whether the degree of certainty that a detected light source is the headlights of an adjacent-adjacent vehicle based on the number of light sources, the position of a light source, the change in time in state of a light source, and the size of the light source. The detection reference setting unit 35 determines whether the degree of certainty is at a predetermined value or greater based on the assessment results of the degree of certainty in step S202, and when the degree of certainty is at the predetermined value or greater, the process proceeds to step S204 in order to set the threshold value α in accordance with the rearward distance from the camera 10, and when the degree of certainty is less than the predetermined value, the process proceeds to step S208 in order to set the threshold value α based on the positional relationship between the camera 10 and the light source.

In step S204, the first threshold value $α_1$ in the detection positions is acquired in accordance with the luminance of the detection positions, as illustrated in FIG. 7. The detection reference setting unit 35 modifies the first threshold value $α_1$ acquired in step S204, based on the gain of the first threshold value $α_1$ specified in accordance with the rearward distance from the camera 10 (step S205). The detection reference setting unit 35 then calculates the first threshold value $α_1$ for all of the detection positions in the detection areas A1, A2, and, when the first threshold value $α_1$ has been calculated for all the detection positions in the detection areas A1, A2 (step S206=Yes), sets the calculated first threshold value $α_1$ as the threshold value α for detecting an adjacent vehicle based on the difference waveform $DW_t$, as illustrated in FIG. 6.

On the other hand, in step S203, the process proceeds to step S208 when the degree of certainty has been determined to be less than the predetermined value. In step S208, the detection reference setting unit 35 sets the line Lc which passes through the centroid position of the detected light source and the center point of the camera 10, as illustrated in the drawing on the right in part (A) of FIG. 13, and the detection reference setting unit 35 furthermore calculates the crossing point O between the line Lc thus set and a side L2' on the adjacent-adjacent vehicle-side of the detection area A2 (step S209). The detection reference setting unit 35 adjusts the control map illustrated in FIG. 12 so that the crossing point O calculated in step S209 and the reference position $P_O$ of the control map illustrated in FIG. 12 match, as illustrated in the drawing on the left in part (B) of FIG. 13 (step S210).

The detection reference setting unit 35 calculates (step S211) the second threshold value $α_2$ in accordance with formula 1 noted above using: the first threshold value map (see FIG. 7) in which the threshold value $α_2'$ is set so that the tire/wheel of an adjacent vehicle is readily detected; the second threshold value map (see FIG. 8) in which the threshold value $α_2''$ is set with emphasis on preventing errant detection in the vicinity of headlights; and the control map adjusted in step S210. The detection reference setting unit 35 then calculates the second threshold value $α_2$ for all of the detection positions in the detection areas A1, A2, and when the second threshold value $α_2$ has been calculated for all of the detection positions in the detection areas A1, A2 (step S212=Yes), the calculated second threshold value $α_2$ is set as the threshold value α for detecting an adjacent vehicle based on the difference waveform $DW_t$, as illustrated in FIG. 6 (step S213).

Returning to FIG. 18, the three-dimensional object detection unit 33 determines whether the peak of the difference waveform $DW_t$ generated in step S104 is equal to or greater than the threshold value α generated in step S105 (step S106). When the peak of the first difference waveform $DW1_t$ is not at the threshold value α or greater, i.e., when there is essentially no difference, it is possible to consider that a three-dimensional object is not present in the captured image P. Accordingly, when it has been determined that the peak of the first difference waveform $DW1_t$ is not at the threshold value α or greater (step S106=No), the three-dimensional object assessment unit 33 determines that another vehicle is not present in the adjacent lane (step S115) and ends the process illustrated in FIG. 18.

On the other hand, when the peak in the first difference waveform $DW1_t$ is determined to be at a threshold value α or greater (step S106=Yes), the three-dimensional object assessment unit 33 determines that a three-dimensional object is present in the adjacent lane and proceeds to step S107, and the difference waveform $DW_t$ is divided in to a plurality of small areas $DW_{t1}$ to $DW_{tn}$ by the three-dimensional object detection unit 33. The three-dimensional object detection unit 33 next imparts weighting to each of the small areas $DW1_{t1}$ to $DW1_{tn}$ (step S108), calculates the offset amount for each of the small areas $DW1_{t1}$ to $DW1_{tn}$ (step S109), and generates a histogram with consideration given to the weightings (step S110).

The three-dimensional object detection unit 33 then calculates the relative movement distance, which is the movement distance of the adjacent vehicle in relation to the host vehicle, based on the histogram (step S111). The three-dimensional object detection unit 33 furthermore calculates the relative movement speed of the adjacent vehicle from the relative movement distance (step S112). At this point the three-dimensional object detection unit 33 time-differentiates the relative movement distance to calculate the relative movement speed, and adds the host vehicle speed detected by the speed sensor 20 to calculate the absolute movement speed of the adjacent vehicle.

The three-dimensional object assessment unit 33 thereafter determines whether the absolute movement speed of the adjacent vehicle is 10 km/h or more and whether the relative movement speed of the adjacent vehicle in relation to the host vehicle is +60 km/h or less (step S113). When both conditions are satisfied (step S113=Yes), the three-dimensional object assessment unit 33 determines that an adjacent vehicle is present in the adjacent lane (step S114). The process illustrated in FIG. 18 is then ended. On the other hand, when either one of the conditions is not satisfied (step S113=No), the three-dimensional object assessment unit 33 determines that an adjacent vehicle is not present in the adjacent lane (step S115). The process illustrated in FIG. 18 is then ended.

In the present embodiment, the detection areas A1, A2 are the rearward side directions of the host vehicle, and focus is placed on whether the host vehicle may possibly make contact with an adjacent vehicle should a lane change be made. Accordingly, the process of step S113 is executed. In other words, assuming that the system in the present embodiment is actuated on an expressway, when the speed of an adjacent vehicle is less than 10 km/h, it would rarely be a problem even if an adjacent vehicle were to be present because the adjacent vehicle would be positioned far behind the host vehicle when a lane change is made. Similarly, when the relative movement speed of an adjacent vehicle exceeds +60 km/h in relation to the host vehicle (i.e., when the adjacent vehicle is moving at a speed 60 km/h greater than the speed of the host vehicle), it would rarely be a problem because the adjacent vehicle would be positioned ahead of the host vehicle when a lane change is made. Consequently, it can be construed that step S113 determines an adjacent vehicle what would be a problem should a lane change be made.

In step S113, it is determined whether the absolute movement speed of the adjacent vehicle is 10 km/h or greater, and whether the relative movement speed of the adjacent vehicle in relation to the host vehicle is +60 km/h or less, thereby obtaining the following effect. For example, a possible case is that the absolute movement speed of a stationary object is detected to be several kilometers per hour depending on the attachment error of the camera 10. Accordingly, determining whether the speed is 10 km/h or greater makes it possible to reduce the possibility that the stationary object will be determined to be an adjacent vehicle. Also, it is possible that the relative speed of an adjacent vehicle in relation to the host vehicle will be detected to be in excess of +60 km/h due to noise. Accordingly, determining whether the relative speed is +60 km/h or less makes it possible to reduce the possibility of errant detection due to noise.

In step S113, it may be determined that the absolute movement speed of the adjacent vehicle is not a negative value, or is not 0 km/h. Also, in the present embodiment, since focus is placed on whether there is a possibility that contact will be made should the host vehicle make a lane change, a warning sound may be emitted to the driver of the host vehicle, or a display corresponding to a warning may be provided by a predetermined display device when a adjacent vehicle has been detected in step S114.

Thus, in the first embodiment, the detection areas A1, A2 rearward of the host vehicle are captured at different moments, the captured images thus captured are converted to bird's-eye view images, and a difference image $PD_t$ is generated based on the difference between the bird's-eye view images at different moments. The number of pixels that indicate a predetermined difference is counted along the direction in which the three-dimensional object collapses due to viewpoint conversion and a frequency distribution is formed to thereby generate a difference waveform $DW_t$ from the difference image $PD_t$ data. It is then determined whether the peak in the generated difference waveform $DW_t$ is at a threshold value α or higher set in accordance with the rearward distance from the camera 10 or the positional relationship between the camera 10 and the light source, and when the peak in the difference waveform $DW_t$ is at the threshold value α or higher, it is determined that an adjacent vehicle is present in the adjacent lane, and the adjacent vehicle present in the adjacent lane can thereby be suitably detected.

In other words, in the present embodiment, light sources to the side and rear of the host vehicle are detected when an adjacent vehicle is to be detected based on the difference waveform $DW_t$, and the degree of certainty that the detected light source is the headlights of an adjacent-adjacent vehicle is assessed based on the number of light sources, the position of the light source, the size of the light source, and the change in time in state of the light source. When the degree of certainty is at a predetermined value or higher, the second threshold value $α_2$ obtained based on the positional relationship between the camera 10 and the light source is set as the threshold value α. In other words, when there is a high possibility that the detected light source is the headlights of an adjacent-adjacent vehicle, the threshold value α is set further forward from the light source so as to prevent errant detection in the vicinity of the headlights, as illustrated in FIG. 10, and the threshold value α is set further rearward from the light source so that the tire/wheel of the adjacent vehicle is readily detected. Since the threshold value α is set high so as to prevent errant detection in the vicinity of the headlights further forward from the headlights (light source) in which a tire/wheel is not present, it is possible to effectively prevent errant detection of an adjacent vehicle due to the headlights of an adjacent-adjacent vehicle even when, e.g., the luminance in the vicinity of the headlights (light source) is high due to soil on the lens of the camera 10, and the tire/wheel of the adjacent vehicle is difficult to detect, the tire/wheel being a characteristic portion present rearward of the headlights (light source). Also since the threshold value α is set so that the tire/wheel of an adjacent vehicle is readily detected further rearward from the headlights (light source), the tire/wheel of an adjacent vehicle present further rearward from the headlights (light source) can be suitably detected.

The three-dimensional object detection device 1 according to the present embodiment has a first threshold value map (see FIG. 10) in which the threshold value $α_2'$ is set so that the tire/wheel of an adjacent vehicle is readily detected, and a second threshold value map (see FIG. 11) in which the threshold value $α_2''$ is set with emphasis on preventing errant detection of an three-dimensional object due to a light source, and, when the degree of certainty is at a predetermined value or higher, imparts a weighting to the threshold value $α_2'$ set in the first threshold value map and to the threshold value $α_2''$ set in the second threshold value map with reference to the control map illustrated in FIG. 12, as indicated in formula 1 noted above to thereby calculate the threshold value α for detecting an adjacent vehicle.

Here, in the present embodiment, adjusting the control map illustrated in FIG. 12 so that the position of the light source and the reference position $P_O$ of the control map illustrated in FIG. 12 results in the weighting wt of the threshold value $α_2''$ obtained from the second threshold value map (the threshold value map in which emphasis is placed on preventing errant detection of three-dimensional object due a light source) being increased in magnitude in the area further forward from the reference position $P_O$ that corresponds to the position of the light source, and results in the weighting wt of the threshold value $α_2''$ obtained from the second threshold value map (the threshold value map in which emphasis is placed on preventing errant detection of three-dimensional object due a light source) being reduced in magnitude in the area further rearward from the reference position $P_O$ that corresponds to the position of the light source. When the luminance is the same, the threshold value α for detecting an adjacent vehicle in the area forward from the light source thereby increases in magnitude, and the threshold value α for detecting an adjacent vehicle in the area rearward from the light source is reduced in magnitude. Accordingly, in the present embodiment, it is possible to suitably detect the tire/wheel of an adjacent vehicle that is present rearward from the headlights (light source), even when the luminance in the vicinity of the headlights (light source) is high due to soil on the lens of the camera 10, and the tire/wheel of the adjacent vehicle is difficult to detect, the tire/wheel being a characteristic portion present rearward of the headlights (light source).

When light from the headlights (light source) of an adjacent-adjacent vehicle is shined into an adjacent lane, there may be cases in which the light from the headlights (light source) reflects and the reflected light is detected in an area forward from the headlights (light source). In such a case, in the present embodiment, the threshold value α for detecting an adjacent vehicle in an area forward from the headlights (light source) can be increased in magnitude in relation to the luminance. It is therefore possible to effectively prevent the image of such reflected light from being errantly detected as an adjacent vehicle.

On the other hand, when the degree of certainty is less than a predetermined value, the first threshold value $α_1$ obtained based on the rearward distance from the camera 10 is set as the threshold value α. In other words, when the possibility that a detected light source is the headlights of an adjacent-adjacent vehicle is low, the gain of the threshold value α is set higher in the area R1 near the host vehicle V1 and area R3 far from the host vehicle than in the center area R2 in the detection areas A1, A2, as illustrated in FIG. 8. The threshold value α can thereby be set high in the areas R1, R3 even when the luminance of the light of the headlights shined from the headlights from an adjacent-adjacent vehicle is low, and an image of the light of the headlights of the adjacent-adjacent vehicle V3 shined into the areas R1, R3 can be effectively prevented from being detected as an adjacent vehicle.

Furthermore, in the present embodiment, the first threshold value $α_1$ obtained based on the rearward distance from the camera 10 is set as the threshold value α when the degree of certainty is less than a predetermined value, and the second threshold value $α_2$ obtained based on the positional relationship between the camera 10 and the light source is set as the threshold value α when the degree of certainty is at a predetermined value or higher. In this case, when the degree of certainty is at a predetermined value or higher, i.e., when the possibility that the detected light source is the headlights of an adjacent-adjacent vehicle is high, the second threshold value $α_2$ obtained based on the positional relationship between the camera 10 and the light source is set to be the threshold value α, and it is thereby possible to eliminate the effect of the headlights of an adjacent-adjacent vehicle and to further enhance the effect of suitably detecting an adjacent vehicle in comparison with when the first threshold value $α_1$ obtained based on the rearward distance from the camera 10 is set to be the threshold value α when the possibility that a detected light source is the headlights of an adjacent-adjacent vehicle is high.

Also, when the degree of certainty is less than a predetermined value, i.e., when the possibility that the detected light source is the headlights of an adjacent-adjacent vehicle is low, there may be cases in which the second threshold value $α_2$ obtained based on the positional relationship between the camera 10 and the light source is set as the threshold value α, e.g., the threshold value α is set excessively high forward from the headlights, and errant detection occurs in which an adjacent vehicle cannot be suitably detected when an adjacent vehicle is actually present. Accordingly, in the present embodiment, setting the first threshold value $α_1$ obtained based on the rearward distance from the camera 10 when the degree of certainty is less than an predetermined value makes it possible to more effectively prevent errant detection of an adjacent vehicle due to light from headlights of the adjacent-adjacent vehicle and to more suitably detect an adjacent vehicle in comparison with when the second threshold value $α_2$ obtained based on the positional relationship between the camera 10 and the light source is set to be the threshold value α when the degree of certainty is less than a predetermined value.

Figure 20:
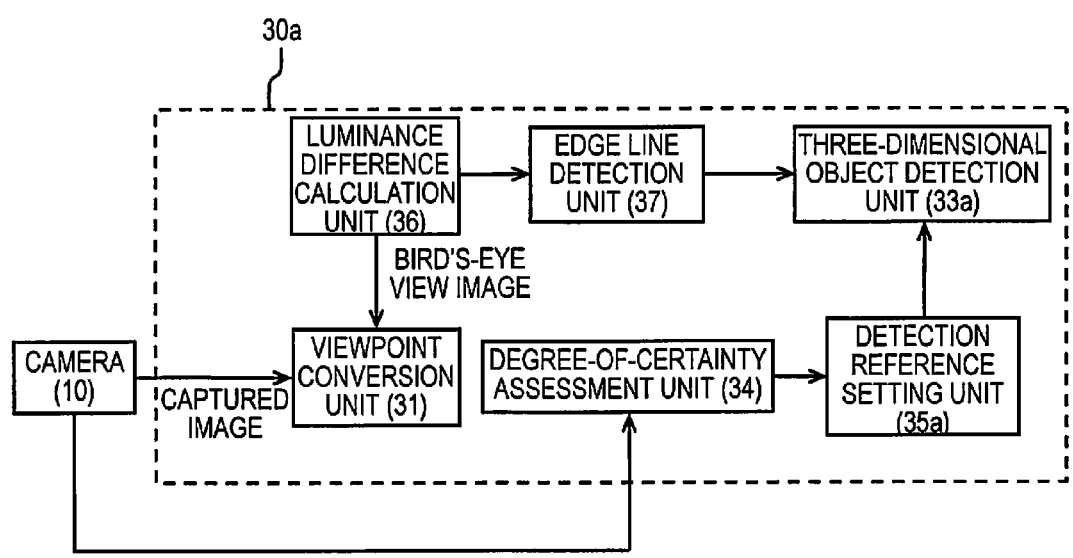
FIG. 20 is a block diagram illustrating the details of the computer according to the second embodiment.

Described next is a three-dimensional object detection device 1a according to the second embodiment. The three-dimensional object detection device 1a according to the second embodiment is the same as the first embodiment, except that a computer 30a is provided in lieu of the computer 30 of the first embodiment, as illustrated in FIG. 20, and the operation is as described below. Here, FIG. 20 is a block view illustrating the details of the computer 30a according to the second embodiment.

The three-dimensional object detection device 1a according to the second embodiment is provided with a camera 10 and a computer 30a, as illustrated in FIG. 20. The computer 30a is provided with a viewpoint conversion unit 31, a luminance difference calculation unit 36, an edge line detection unit 37, a three-dimensional object detection unit 33a, a degree-of-certainty assessment unit 34, and a detection reference setting unit 35a. The configurations of the three-dimensional object detection device 1a according to the second embodiment are described below.

Figure 21:
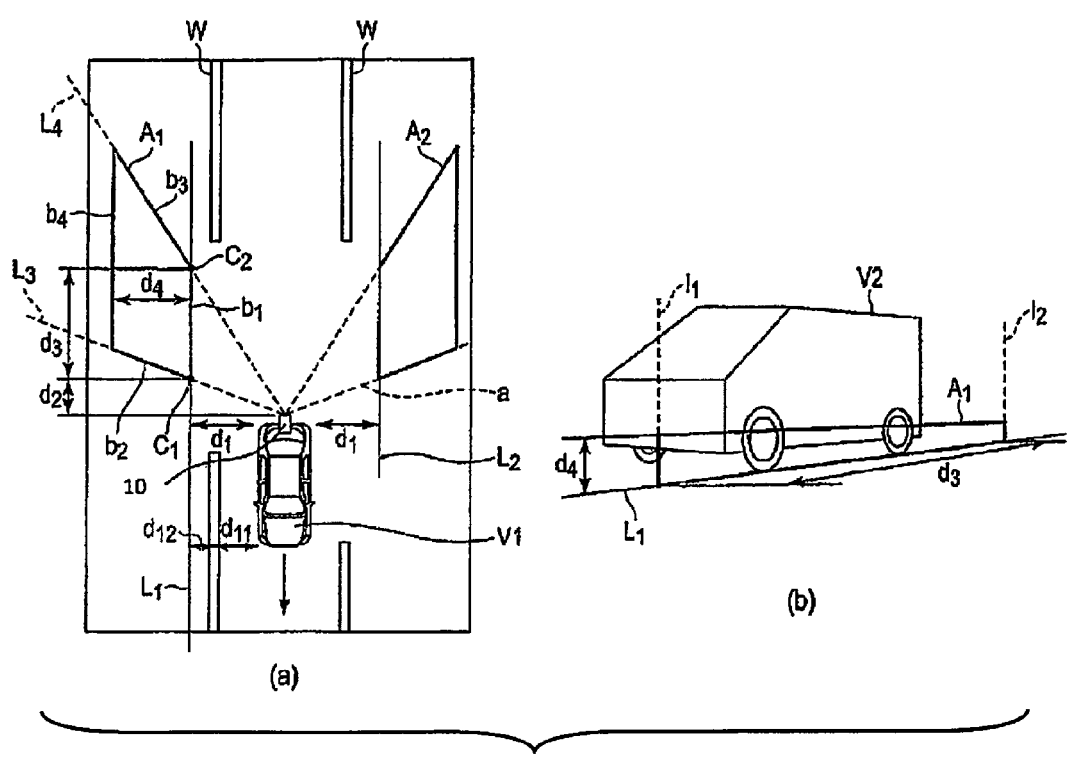
FIG. 21 is a view illustrating the travel state of the vehicle, with part (a) illustrating the positional relationship between the detection area and the like from a top plan view, and part (b) illustrating the positional relationship between the detection area and the like in real space in perspective.

FIG. 21 is a view illustrating the image range of the camera 10 in FIG. 20, with part (a) being a plan view, and part (b) being a perspective view in real space rearward from the host vehicle V1. The camera 10 is set to a predetermined view angle a, and the rearward side of the host vehicle V1 included in the predetermined view angle a is captured, as illustrated in part (a) of FIG. 21. The view angle a of the camera 10 is set so that adjacent lanes are included in the capture range of the camera 10 in addition to the lane in which the host vehicle V1 is traveling, in the same manner as illustrated in FIG. 2.

The detection areas A1, A2 in the present example are trapezoidal in a plan view (bird's-eye view state), the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is traveling, is in contact with the ground. In the present embodiment, an object is to detect an adjacent vehicle V2 or the like (including two-wheeled vehicles or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is travelling (the distance d12 from the white line W) and the position in which the host vehicle V1 is travelling (the distance d11 from the white line W) is mostly predictable, and the distance d1 is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is an adjacent vehicle V2 or the like, and therefore the distance d3 is set to a length that includes the adjacent vehicle V2.

The distance d4 indicates the height, which has been set so that the tires of the adjacent vehicle V2 or the like are included in real space, as illustrated in part (b) of FIG. 21. In a bird's-eye view image, the distance d4 is the length illustrated in part (a) of FIG. 21. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 21.

Returning to FIG. 20, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 36 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 36 calculates, for each of a plurality of positions along a perpendicular imaginary line extending along the perpendicular direction in real space, the luminance difference between two pixels near each position. The luminance difference calculation unit 36 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 36 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 36 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 36 is described in detail below.

The luminance difference calculation unit 36 sets a first perpendicular imaginary line La (hereinbelow referred to as attention line La) that corresponds to a line segment extending in the perpendicular direction in real space and that passes through the detection area A1, as illustrated in FIG. 22(a). The luminance difference calculation unit 36 sets a second perpendicular imaginary line Lr (hereinbelow referred to as reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 36 sets an attention point Pa on the attention line La (a point on the first perpendicular imaginary line). The luminance difference calculation unit 36 sets a reference point Pr on the reference line Lr (a point on the second perpendicular imaginary line). The attention line La, the attention point Pa, the reference line Lr, and the reference point Pr have the relationship in real space illustrated in part (b) of FIG. 22. It is apparent from part (b) of FIG. 22 that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 36 determines the luminance difference between the attention point Pa and the reference point Pr. If the luminance difference between the attention point Pa and the reference point Pr is great, it is possible that an edge is present between the attention point Pa and the reference point Pr. In the second embodiment in particular, a perpendicular imaginary line is set as a line segment extending in the perpendicular direction in real space in relation to the bird's-eye view image, in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 37 illustrated in FIG. 20 detects an edge line based on the luminance difference between the attention point Pa and the reference point Pr.

Figure 23:
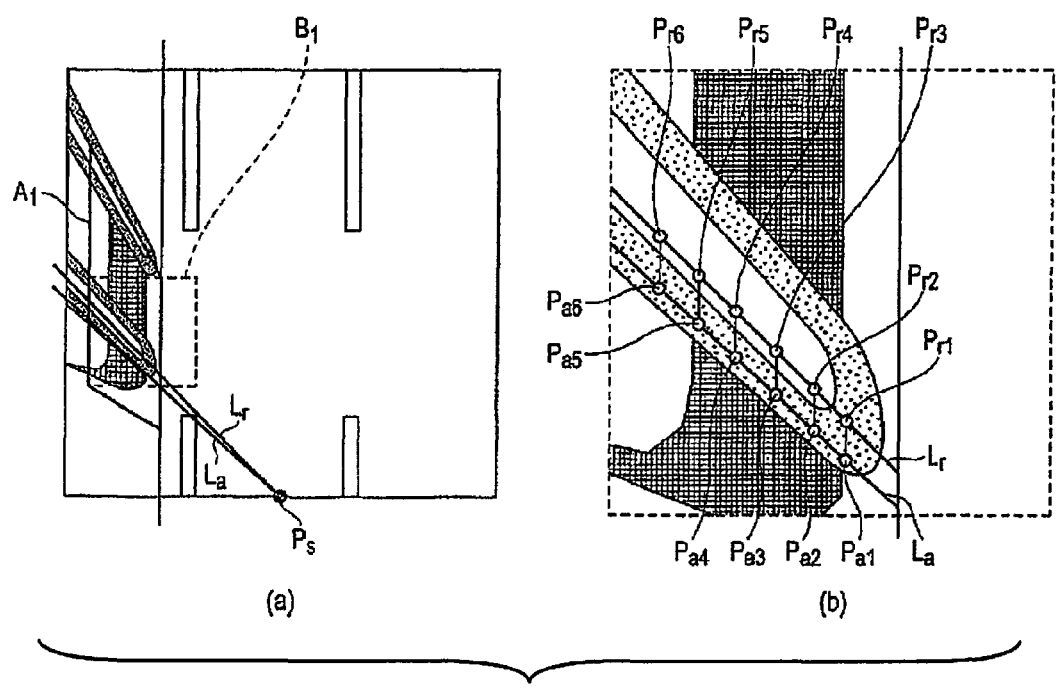
FIG. 23 is a view for describing the detailed operation of the luminance difference calculation unit according to the second embodiment, with part (a) illustrating the detection area in the bird's-eye view image, and part (b) illustrating the positional relationship between the attention line, reference line, attention point, and reference point in the bird's-eye view image.

This point will be described in greater detail. FIG. 23 is a view for describing the detailed operation of the luminance difference calculation unit 36. Part (a) of FIG. 23 illustrates a bird's-eye view image of the bird's-eye view state, and part (b) of FIG. 23 is an enlarged view of the bird's-eye view image illustrated in FIG. 23(a). In FIG. 23, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 23. The attention line La is set on a rubber portion of a tire of the adjacent vehicle V2 in the bird's-eye view image in part (b) of FIG. 23, as illustrated in the enlarged view of area B1 in part (a) of FIG. 23. In this state, first, the luminance difference calculation unit 36 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, e.g., at a distance that corresponds to 10 cm from the rubber of the tire of the adjacent vehicle V2 in the bird's-eye view image.

Next, the luminance difference calculation unit 36 sets a plurality of attention points Pa1 to PaN on the attention line La. In part (b) of FIG. 23, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 36 subsequently sets the reference points Pr1 to PrN so as to have the same height as the attention points Pa1 to PaN in real space. The luminance difference calculation unit 36 calculates the luminance difference between attention point Pa and reference point Pr pairs at the same height. The luminance difference calculation unit 36 thereby calculates the luminance difference between two pixels for each of the plurality of positions (1–N) along the perpendicular imaginary line extending in the perpendicular direction in real space. The luminance difference calculation unit 36 calculates the luminance difference between, e.g., a first attention point Pa1 and a first reference point Pr1, and calculates the luminance difference between a second attention point Pa2 and a second reference point Pr2. The luminance difference calculation unit 36 thereby determines the luminance difference in continuous fashion along the attention line La and the reference line Lr. In other words, the luminance difference calculation unit 36 sequentially determines the luminance difference between the third to $N^{th}$ attention points Pa3 to PaN and the third to $N^{th}$ reference points Pr3 to PrN.

The luminance difference calculation unit 36 repeats the process of setting the above-described reference line Lr, setting the attention point Pa, setting the reference point Pr, and calculating the luminance difference while shifting the attention line La within the detection area A1. In other words, the luminance difference calculation unit 36 repeatedly executes the above-described process while changing the positions of the attention line La and the reference line Lr by the same distance in real space along the direction in which the ground line L1 extends. The luminance difference calculation unit 36, e.g., sets the line that was the reference line Lr in the previous process to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the process for detecting the three-dimensional object being affected, even when the three-dimensional object is enlarged in accordance with the height from the road surface by conversion to a bird's-eye view image in order compare the luminance between the perpendicular imaginary lines extending in the perpendicular direction in real space.

Returning to FIG. 20, the edge line detection unit 37 detects the edge line from the continuous luminance difference calculated by the luminance difference calculation unit 36. For example, in the case illustrated in part (b) of FIG. 23, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 37 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 37 first assigns an attribute to the $i^{th}$ attention point Pai from the luminance difference between the $i^{th}$ attention point Pai (coordinates (xi, yi)) to the $i^{th}$ reference point Pri (coordinates (xi', yi')) in accordance with formula 2 noted below.

$s(xi,yi)=1$ when $I(xi, yi) > I(xi', yi') + t$ $s(xi,yi)=-1$ when $I(xi, yi) < I(xi', yi') - t$ $s(xi,yi)=0$      Formula 2 when the above do not hold true.

In formula 2 above, t represents a predetermined threshold value, I(xi, yi) represents the luminance value of the $i^{th}$ attention point Pai, and I(xi', yi') represents the luminance value of the $i^{th}$ reference point Pri. In accordance with formula 2, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 37 assesses whether the attention line La is an edge line from the continuity c(xi, yi) of the attribute s along the attention line La based on the following formula 3.

$c(xi,yi)=1$ when $s(xi, yi) = s(xi+1, yi+1)$ (excluding when 0=0)

$c(xi,yi)=0$      Formula 3 when the above does not hold true.

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 37 determines the sum of the continuities c of all the attention points Pa on the attention line La. The edge line detection unit 37 divides the sum of the continuities c thus determined by the number N of attention points Pa to thereby normalize the continuity c. The edge line detection unit 37 determines the attention line La to be an edge line when the normalized value has exceeded a threshold value θ. The threshold value θ is set in advance by experimentation or other means.

In other words, the edge line detection unit 37 determines whether the attention line La is an edge line based on formula 4 noted below. The edge line detection unit 37 then determines whether all of the attention lines La drawn on the detection area A1 are edge lines.

$\Sigma c(xi,yi)/N > \theta$      Formula 4

Figure 24:
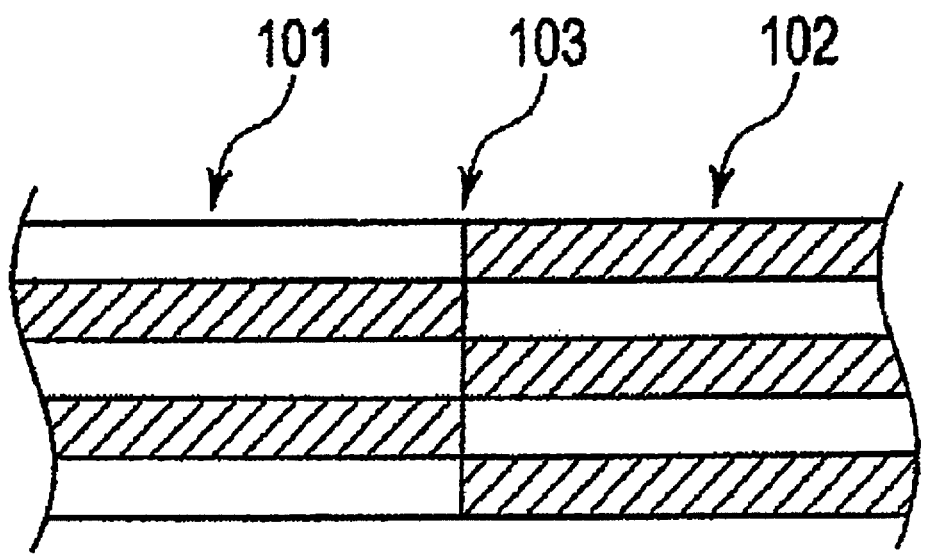
FIG. 24 is a view illustrating an image example for describing edge detection operation.

In this manner, in the second embodiment, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with the natural senses of a human. The results of the above will be described. FIG. 24 is a view illustrating an image example for describing the processing of the edge line detection unit 37. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 37 assesses the location 103 to be an edge line only when there is continuity in the attributes of the luminance difference. Therefore, the edge line detection unit 37 is capable of suppressing errant assessment in which the location 103, which is not recognized as an edge line by human senses, is recognized as an edge line, and edges can be detected in accordance with human senses.

Returning to FIG. 20, the three-dimensional object detection unit 33a detects a three-dimensional object based on the quantity of edge lines detected by the edge line detection unit 37. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 37. Specifically, the three-dimensional object detection unit 33a determines whether the quantity of edge lines detected by the edge line detection unit 37 is a predetermined threshold value β or greater, and when the quantity of edge lines is a predetermined threshold value β or greater, the edge lines detected by the edge line detection unit 37 are determined to be the edge lines of a three-dimensional object, and a three-dimensional object based on edge lines is thereby detected to be an adjacent vehicle V2.

Thus, the edge waveform is one mode of distribution information of pixels that indicate a predetermined luminance difference, and the "distribution information of pixels" in the present embodiment can be positioned with information indicating the state of distribution of "pixels having a luminance difference at a predetermined threshold value or greater" as detected along the direction in which the three-dimensional object collapses when the captured image is converted in viewpoint to a bird's-eye view image. In other words, the three-dimensional object detection unit 33a detects, in the bird's-eye view image obtained by the viewpoint conversion unit 31, the distribution information of pixels in which the luminance difference is a threshold value t or higher along the direction in which the three-dimensional object collapses when conversion in viewpoint is made to a bird's-eye view image, and detects a three-dimensional object based on the distribution information of pixels (edge lines) when the degree of distribution of pixels (quantity of edge lines) in the direction in which the three-dimensional object collapses is at a predetermined threshold value β or greater.

In the second embodiment, the threshold value β for detecting an adjacent vehicle based on edge lines is set by the detection reference setting unit 35a. In the same manner as the first embodiment, in the second embodiment, the detection reference setting unit 35a sets, based on degree of certainty detected by the degree-of-certainty assessment unit 34 illustrated in FIG. 20, the third threshold value $β_1$ set in accordance with the rearward distance from the camera 10 or the fourth threshold value $β_2$ set in accordance with the positional relationship between the camera 10 and the light source to be the threshold value β for detecting an adjacent vehicle based on edge lines.

In other words, the detection reference setting unit 35a determines whether the degree of certainty assessed by the degree-of-certainty assessment unit 34 is at a predetermined value or higher, and when the degree of certainty is less than the predetermined value, the third threshold value $β_1$ set in accordance with the rearward distance from the camera 10 is set as the threshold value β for detecting the adjacent vehicle based on the edge lines. On the other hand, when the degree of certainty is at a predetermined value or higher, the fourth threshold value $β_2$ set in accordance with the positional relationship between the camera 10 and the light source is set as the threshold value β for detecting an adjacent vehicle based on the edge lines.

In the second embodiment, the degree-of-certainty assessment unit 34 comprehensively assesses the degree of certainty that a detected light source is the headlights of an adjacent-adjacent vehicle based on the number of light sources, the position of a light source, and the change in time in state of a light source, in the same manner as the first embodiment. Comprehensively determining the number of light sources, the position of a light source, and the change in time in state of a light source in this manner makes it possible to suitably determine whether a detected light source is from the headlights of an adjacent-adjacent vehicle. The degree-of-certainty assessment unit 34 may be configured to give consideration to the size of the detected light source in the same manner as the first embodiment when the degree of certainty is assessed.

Figure 25:
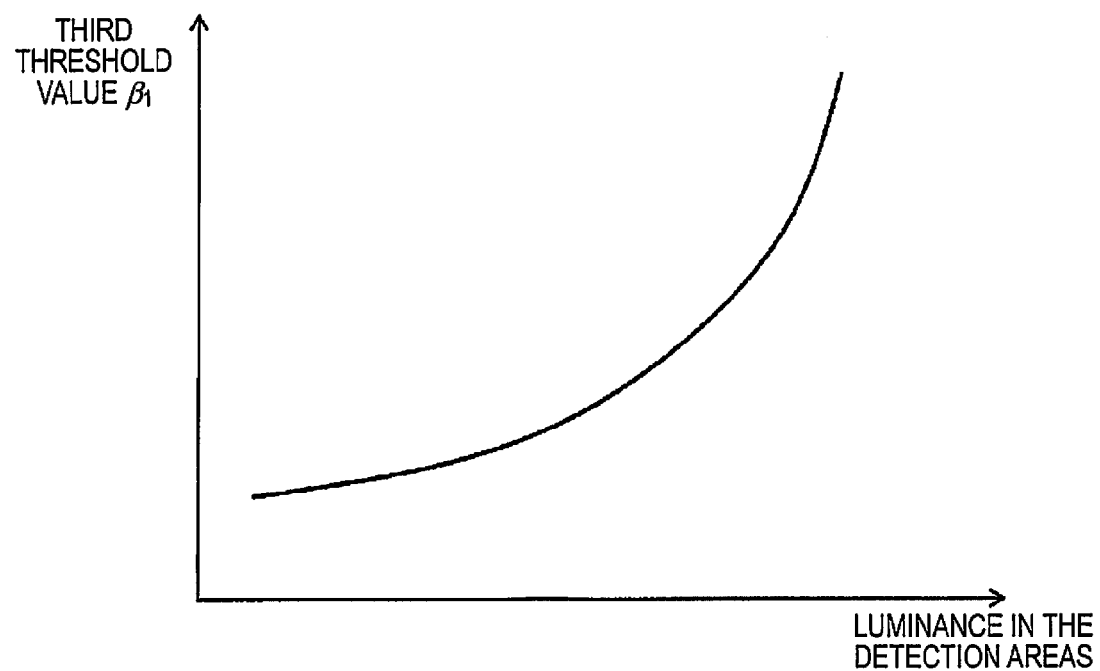
FIG. 25 is a graph illustrating an example of the relationship between the luminance in the detection positions in the detection areas A1, A2 and the third threshold value $\beta_1$.
Figure 26:
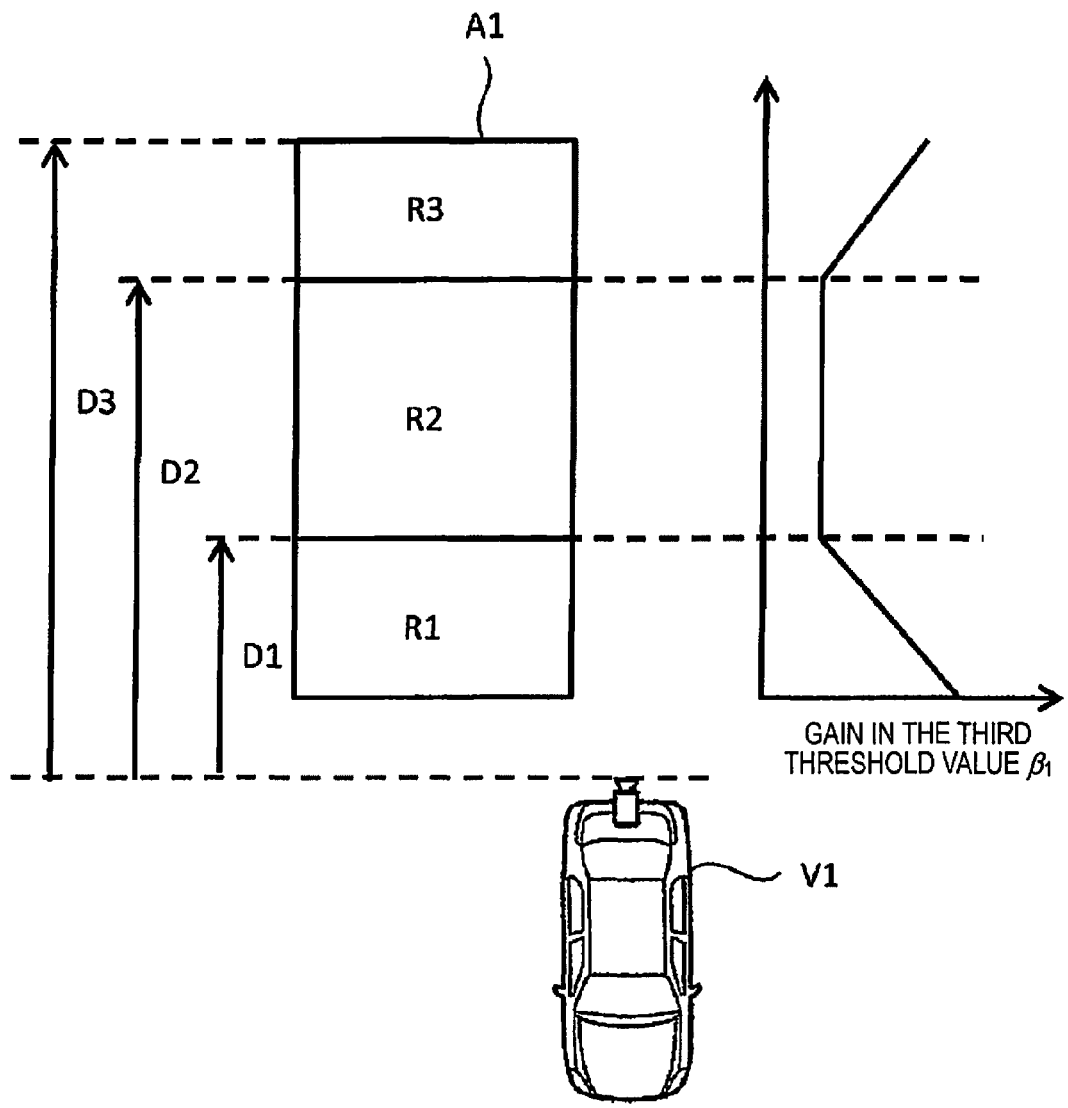
FIG. 26 is a view describing the relationship between the rearward distance from the camera and the third threshold value $\beta_1$.

Here, in the second embodiment, the detection reference setting unit 35a sets the third threshold value $β_1$ in the following manner. In other words, the detection reference setting unit 35a sets the third threshold value $β_1$ to a higher value in commensurate fashion to the higher luminance in the detection positions in the detection areas A1, A2 (e.g., the position corresponding to the attention line La in the detection areas A1, A2), as illustrated in FIG. 25, in the same manner as the first embodiment. The detection reference setting unit 35a increases the gain of the third threshold value $β_1$ in the area R1 of the detection areas A1, A2 more than in the area R2 to thereby modify the third threshold value $β_1$ set in accordance with the luminance to be a higher value in the area R1 in the detection areas A1, A2 in comparison with the area R2 in the detection areas A1, A2, as illustrated in FIG. 26. Furthermore, the detection reference setting unit 35a increases the gain of the third threshold value $β_1$ in commensurate fashion to a shorter rearward distance from the camera 10 (nearer to the host vehicle) in the area R1 in the detection areas A1, A2 to thereby modify the third threshold value $β_1$ set in accordance with the luminance to a higher value in commensurate fashion to the proximity to the host vehicle.

Figure 22:
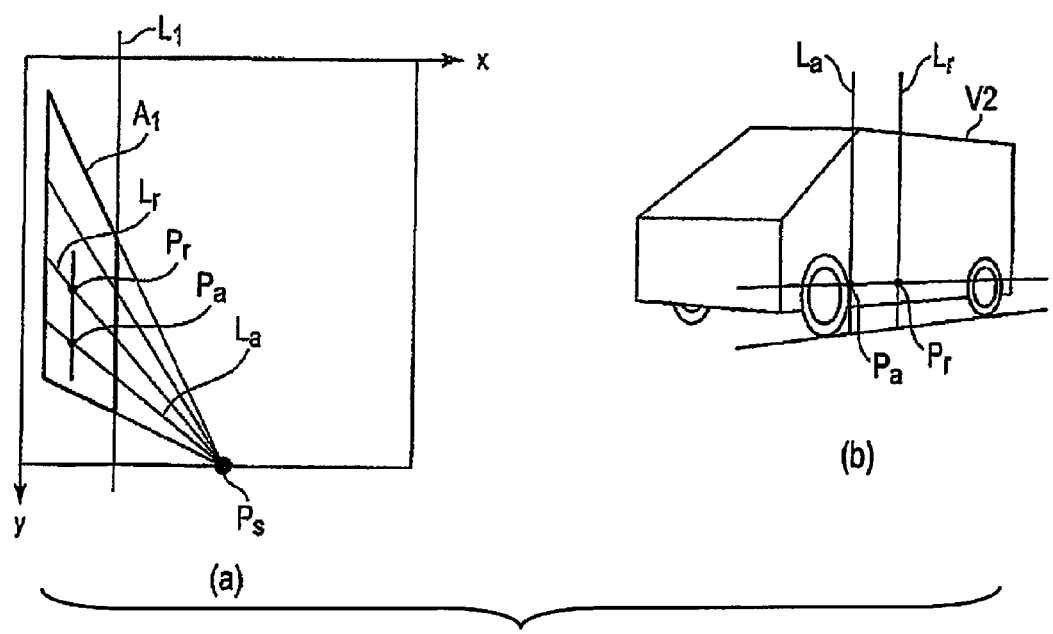
FIG. 22 is a view for describing the operation of the luminance difference calculation unit according to the second embodiment, with part (a) illustrating the positional relationship between the attention line, reference line, attention point, and reference point in a bird's-eye view image, and part (b) illustrating the positional relationship between the attention line, reference line, attention point, and reference point real space.

Similarly, the detection reference setting unit 35a increases the gain of the third threshold value $β_1$ in the area R3 as well of the detection areas A1, A2 more than in the area R2 in the detection areas A1, A2 to thereby modify the third threshold value $β_1$ set in accordance with the luminance to be a higher value in the area R3 in the detection areas A1, A2 in comparison with the area R2 in the detection areas A1, A2, as illustrated in FIG. 22. Furthermore, the detection reference setting unit 35a increases the gain of the third threshold value $β_1$ in commensurate fashion to a greater rearward distance from the camera 10 (farther from the host vehicle) in the area R3 in the detection areas A1, A2 to thereby modify the third threshold value $β_1$ set in accordance with the luminance to a higher value in commensurate fashion to the distance from the host vehicle.

In the second embodiment as well, it is thereby possible to effectively prevent an image of the light of headlights from being errantly detected as an adjacent vehicle in the same manner as the first embodiment, even in the area R2 where the luminance of the light of the headlights shined from the adjacent-adjacent vehicle V3 is high, or in areas R1, R3 where the luminance of the light of the headlights shined from the adjacent-adjacent vehicle V3 is low in a situation in which light from the headlights of an adjacent-adjacent vehicle V3 is shined into the adjacent lane, e.g., at nighttime.

Figure 27:
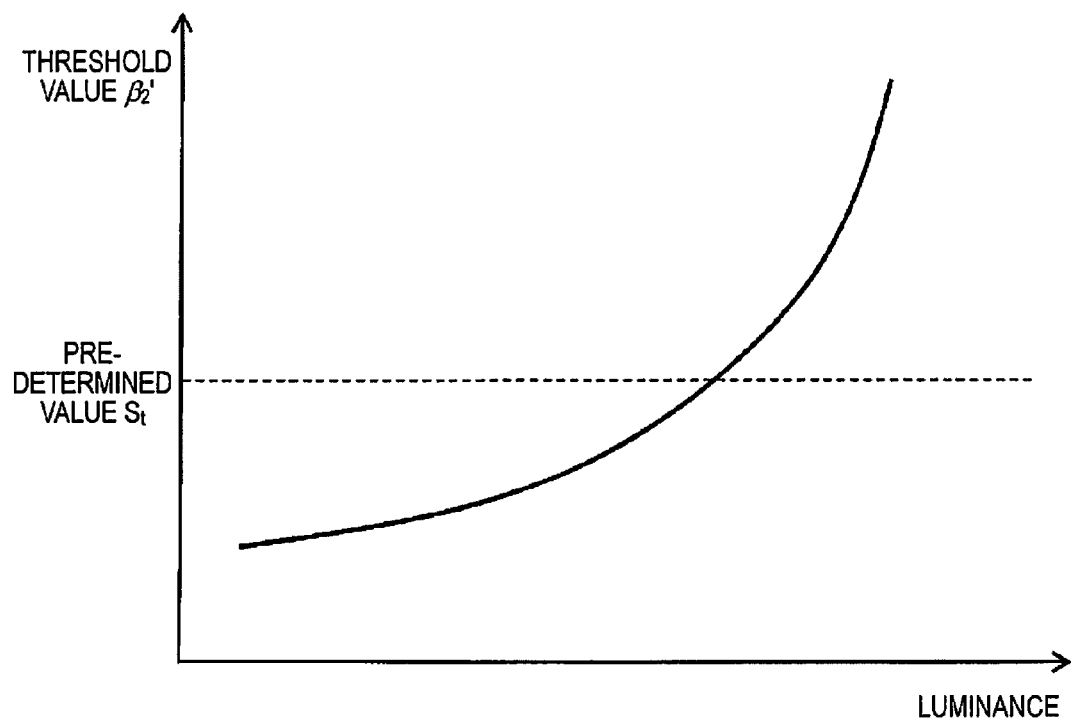
FIG. 27 is a view illustrating an example of the third threshold value map for illustrating the relationship between the luminance in the detection areas A1, A2 and the threshold value $\beta_2'$.
Figure 28:
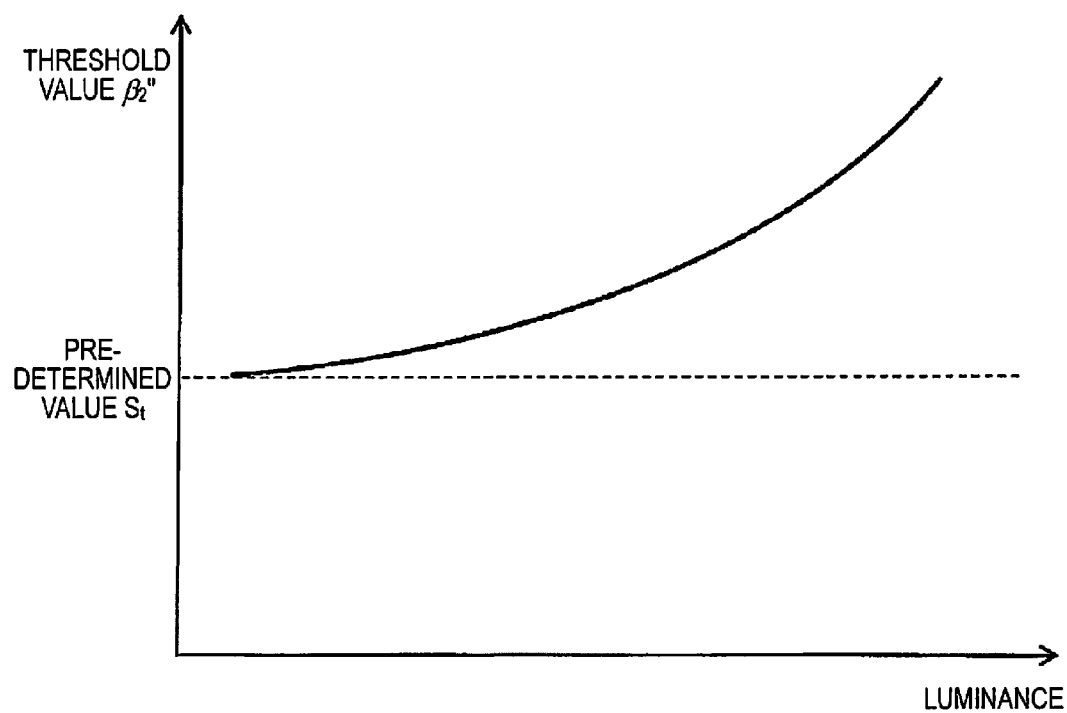
FIG. 28 is a view illustrating an example of the fourth threshold value map for illustrating the relationship between the luminance in the detection areas A1, A2 and the threshold value $\beta_2''$.
Figure 29:
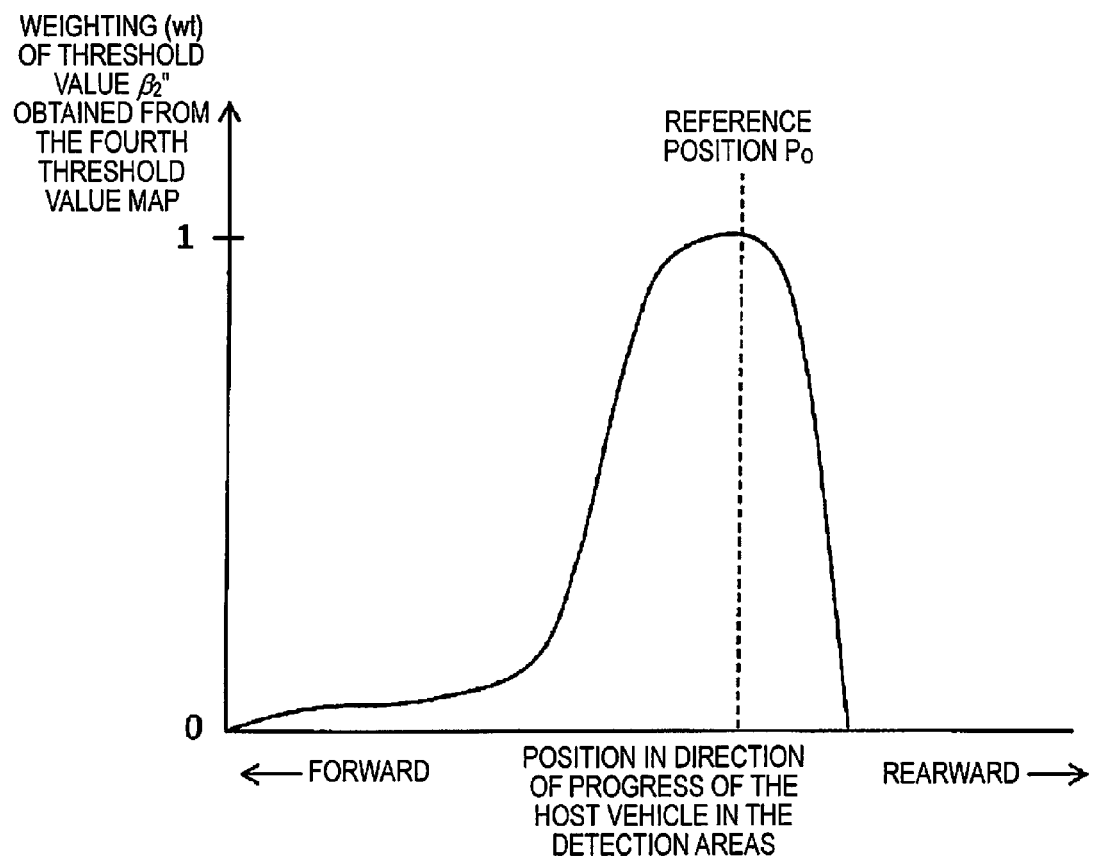
FIG. 29 is a view illustrating an example of the control map in which the weighting wt of the threshold value $\beta_2''$ obtained from the fourth threshold value map has been specified.

In the second embodiment, the detection reference setting unit 35a sets the fourth threshold value $β_2$ in the following manner. In other words, the detection reference setting unit 35a has, in the same manner as the first embodiment, a third threshold value map in which predetermined the threshold value $β_2$' is set in accordance with the luminance in the detection position in the detection areas A1, A2 so that the tire/wheel, which is a characteristic portion of an adjacent vehicle, is readily detected, as illustrated in FIG. 27, and a fourth threshold value map in which a predetermined threshold value $\beta_2''$ is set in accordance with the luminance in the detection positions in the detection areas A1, A2 so that errant detection of an adjacent vehicle does not occur in the vicinity of headlights, as illustrated in FIG. 28. Also, in the same manner as the first embodiment, the detection reference setting unit 35a is provided with a control map in which the weighting wt of the threshold value $\beta_2''$ obtained from the fourth threshold value map is specified, as illustrated in FIG. 29.

The detection reference setting unit 35a then imparts the weighting wt of the second threshold value $\beta_2''$ specified in the control map illustrated in FIG. 29 in accordance with the position of the light source to the threshold value $\beta_2'$ obtained from the third threshold value map and to the threshold value $\beta_2''$ obtained from the fourth threshold value map in accordance with formula 5 noted below in the same manner as in the first embodiment, and thereby calculates the fourth threshold value $\beta_2$ for detecting an adjacent vehicle based on the edge information. In the second embodiment, the position of the detected light source and the reference position $P_O$ of the control map illustrated in FIG. 29 are made to match each other and the control map illustrated in FIG. 29 is adjusted in similar fashion to the first embodiment.

Fourth threshold value $\beta_2$={(1−wt)·threshold value $\beta_2'$ obtained from the third threshold value map}+(wt·threshold value $\beta_2''$ obtained from the fourth threshold value map)   Formula 5

In this manner, the detection reference setting unit 35a is capable of setting the third threshold value $\beta_1$ set in accordance with the rearward distance from the camera 10 and the fourth threshold value $\beta_2$ set in accordance with the positional relationship between the camera 10 and the light source. The detection reference setting unit 35a then determines whether the degree of certainty assessed by the degree-of-certainty assessment unit 34 is at a predetermined value or higher; when the degree of certainty is less than the predetermined value, the third threshold value $\beta_1$ is set as the threshold value $\beta$ for detecting an adjacent vehicle based on the edge lines; and on the other hand, when the degree of certainty is at the predetermined value or higher, the fourth threshold value $\beta_2$ is set as the threshold value $\beta$ for detecting an adjacent vehicle based on the edge lines.

Furthermore, prior to detecting the three-dimensional object, the three-dimensional object detection unit 33a assesses whether the edge lines detected by the edge line detection unit 37 are correct. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by errant assessment. On the other hand, when the change in luminance on the edge lines in the bird's-eye view image is less than a predetermined threshold value tb, it is assessed that the edge lines are correct. The threshold value tb is set in advance by experimentation or other means.

Figure 30:
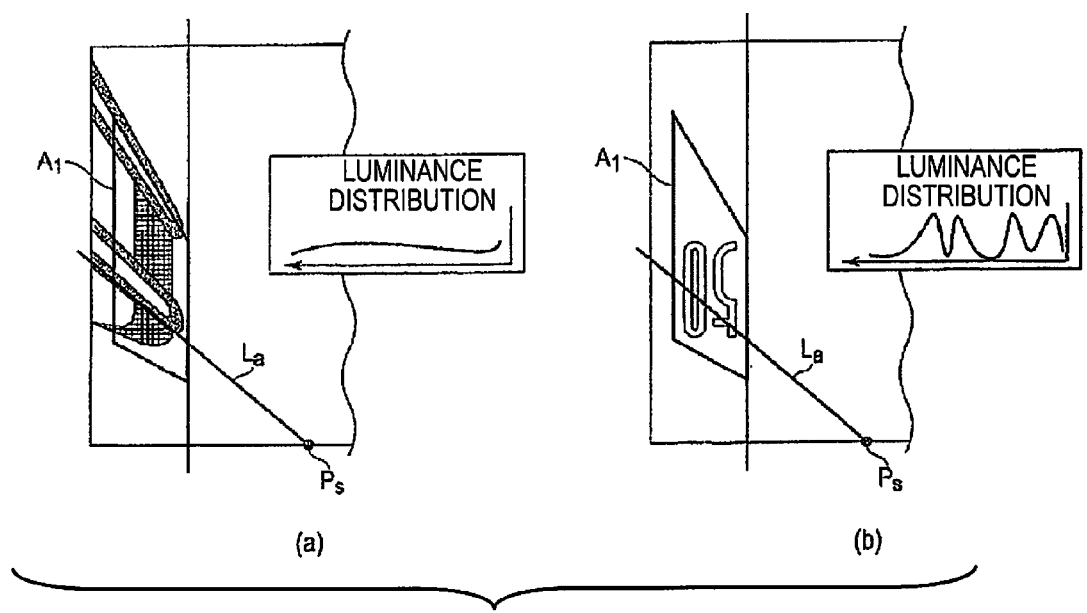
FIG. 30 is a view illustrating the edge line and the luminance distribution on the edge line, with part (a) illustrating the luminance distribution when a three-dimensional object (adjacent vehicle) is present in the detection area, and part (b) illustrating the luminance distribution when a three-dimensional object is not present in the detection area.

FIG. 30 is a view illustrating the luminance distribution of the edge line, with part (a) of FIG. 30 illustrating the edge line and the luminance distribution when an adjacent vehicle V2 as a three-dimensional object is present in the detection area A1, and part (b) of FIG. 30 illustrating the edge line and the luminance distribution when a three-dimensional object is not present in the detection area A1.

As illustrated in part (a) of FIG. 30, it is assumed that it has been determined that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the adjacent vehicle is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 30. In this case, the change in luminance on the attention line La in the bird's-eye view image has considerable undulations. This is because the road and other portions of low luminance are mixed with the portions of high luminance in the white characters on the edge line.

The three-dimensional object detection unit 33a assesses whether an edge line has been detected by errant assessment based on differences in the luminance distribution on the attention line La as described above. The three-dimensional object detection unit 33a determines that the edge line has been detected by errant assessment when the change in luminance along the edge line is at a predetermined threshold value tb or greater, and determines that the edge line is not caused by a three-dimensional object. A reduction in precision for detecting a three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 6 or 7 noted below. The change in luminance of the edge line corresponds to the evaluation value in real space in the perpendicular direction. Formula 6 evaluates the luminance distribution using the total value of the square of the difference between the luminance value I(xi, yi) and the adjacent $i^{th}$+1 luminance value I(xi+1, yi+1) on the attention line La. Formula 7 evaluates the luminance distribution using the total value of the absolute value of the difference between the $i^{th}$ luminance value I(xi, yi) and the adjacent $i^{th}$+1 luminance value I(xi+1, yi+1) on the attention line La.

Evaluation value in perpendicular equivalent direction=$\Sigma[\{I(xi,yi)-I(xi+1,yi+1)\}^2]$   Formula 6

Evaluation value in perpendicular equivalent direction=$\Sigma|I(xi,yi)-I(xi+1,yi+1)|$   Formula 7

No limitation is imposed in the use of formula 7, and it is also possible to binarize an attribute b of an adjacent luminance value using a threshold value t2, and then sum the binarized attribute b for all of the attention points Pa, as in formula 8 noted below.

Evaluation value in perpendicular equivalent direction=$\Sigma b(xi,yi)$   Formula 8 where b(xi, yi)=1 when |I(xi, yi)−I(xi+1, yi+1)|>t2 and b(xi, yi)=0
when the above does not hold true.

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 33a then sums the attribute b for all of the attention points Pa on the attention line La and determines the evaluation value in the perpendicular equivalent direction to thereby assess whether an edge line is caused by a three-dimensional object and that a three-dimensional object is present.

Figure 31:
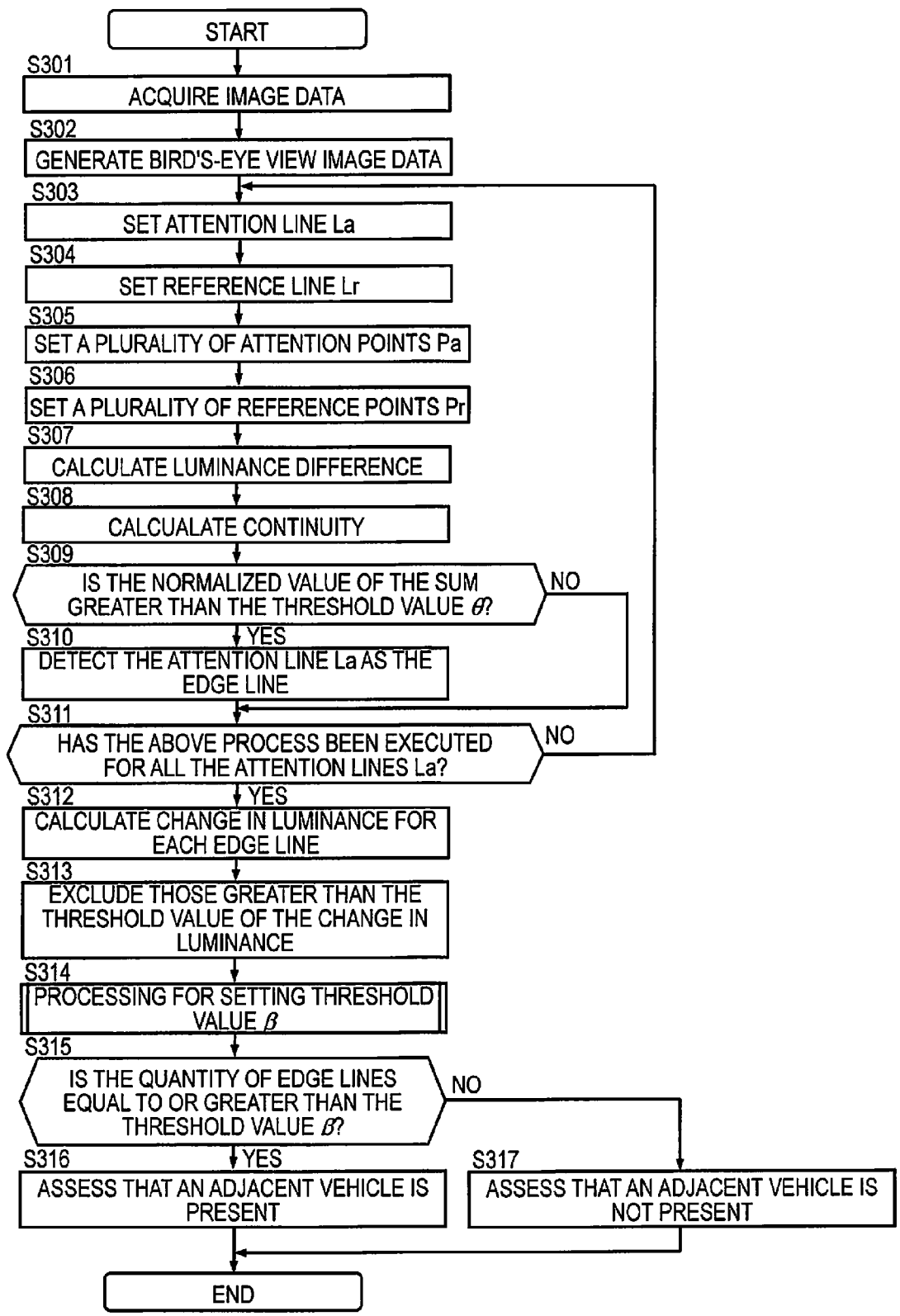
FIG. 31 is a flowchart illustrating the method for detecting an adjacent vehicle according to the second embodiment.

Next, the method for detecting an adjacent vehicle according to the second embodiment will be described. FIG. 31 is a flowchart illustrating the details of the method for detecting an adjacent vehicle according to the present embodiment. In FIG. 31, the process involved with detection area A1 will be described for the sake of convenience, but the same process is executed for the detection area A2 as well.

First, in step S301, a predetermined area specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates bird's-eye view image data in step S302.

Next, in step S303, the luminance difference calculation unit 36 sets the attention line La on the detection area A1. At this time, the luminance difference calculation unit 36 sets a line corresponding to a line extending in the perpendicular direction in real space as the attention line La. In step S304, the luminance difference calculation unit 36 subsequently sets the reference line Lr on the detection area A1. At this point, the luminance difference calculation unit 36 sets, as the reference line Lr, a line that corresponds to a line extending in the perpendicular direction in real space, the line also being separated by a predetermined distance in real space from the attention line La.

Next, in step S305, the luminance difference calculation unit 36 sets a plurality of attention points Pa on the attention line La. Also, at this time, the luminance difference calculation unit 36 sets a certain number of attention points Pa that will not be problematic during edge detection by the edge line detection unit 37. Also, in step S306 the luminance difference calculation unit 36 sets reference points Pr so that the attention points Pa and the reference points Pr are at substantially the same height in real space. The attention points Pa and the reference points Pr thereby line up in substantially the horizontal direction, and the edge line extending in the perpendicular direction in real space is more readily detected.

Next, in step S307, the luminance difference calculation unit 36 calculates the luminance difference between the attention points Pa and the reference points Pr at the same height in real space. The edge line detection unit 37 then calculates the attribute s of the attention points Pa in accordance with formula 2 described above. In step S308, the edge line detection unit 37 then calculates the continuity c of the attribute s of the attention points Pa in accordance with formula 3 noted above. In step S309, the edge line detection unit 37 furthermore assesses whether a value obtained by normalizing the sum of the continuity c is greater than a threshold value θ in accordance with formula 4. When it has been determined that the normalized value is greater than the threshold value θ (step S309=Yes), the edge line detection unit 37 detects the attention line La as the edge line in step S310. The process then proceeds to step S311. When it has been determined that the normalized value is not greater than the threshold value θ (step S309=No), the edge line detection unit 37 does not detect that the attention line La is an edge line, and the process proceeds to step S311.

In step S311, the computer 30a determines whether the processes of steps S303 to S310 have been executed for all the attention lines La that can be set on the detection area A1. When it has been determined that the above processes have not been carried out for all the attention lines La (step S311=No), the process returns to step S303, sets a new attention line La, and repeats the process through step S311. On the other hand, when it has been determined that the processes have been carried out for all the attention lines La (step S311=Yes), the process proceeds to step S312.

In step S312, the three-dimensional object detection unit 33a calculates the change in luminance along the edge line for each edge line detected in step S310. The three-dimensional object detection unit 33a calculates the change in luminance of edge lines in accordance with any of formulas 6, 7, and 8. Next, in step S313, the three-dimensional object detection unit 33a excludes, from among the edge lines, edge lines in which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or other means in advance, and is set based on the change in luminance that occurs due to characters on the road surface, roadside vegetation, and the like. On the other hand, the three-dimensional object detection unit 33a determines an edge line having a change in luminance that is less than a predetermined threshold value tb to be an edge line of a three-dimensional object, and thereby detects the three-dimensional object present in an adjacent lane.

Next, in step S314, the detection reference setting unit 35a sets the threshold value β for assessing whether the three-dimensional object detected in step S313 is an adjacent vehicle. Specifically, the detection reference setting unit 35a detects a light source to the rear and side of the of the host vehicle and assesses the degree of certainty indicating the plausibility that the detected light source is the headlights of an adjacent-adjacent vehicle to the rear and side of the host vehicle, in the same manner as steps S105 in the first embodiment. When the degree of certainty is at a predetermined value or greater, the detection reference setting unit 35a sets a third threshold value $\beta_1$ as the threshold value β for detecting an adjacent vehicle based on the edge lines, and, on the other hand, sets a fourth threshold value $\beta_2$ as the threshold value β for detecting an adjacent vehicle based on the edge lines when the degree of certainty is less than the predetermined value.

Next, in step S315, it is determined by the three-dimensional object assessment unit 33a whether the quantity of edge lines is a threshold value β or higher as set in step S314. When is has been assessed that the quantity of edge lines is at a threshold value β or higher (step S315=Yes), the three-dimensional object assessment unit 33a assesses in step S316 that an adjacent vehicle is present in the detection area A1. On the other hand, when the quantity of edge lines assessed to not be at the threshold value β or greater (step S315=No), the three-dimensional object detection unit 33a assesses that an adjacent vehicle is not present in the detection area A1 in step S317. The process illustrated in FIG. 31 then ends.

As described above, in the second embodiment, a captured image is converted to a bird's-eye view image, and edge information of a three-dimensional object is detected from the converted bird's-eye view image. It is determined whether the quantity of detected edge lines is at a threshold value β or higher set in accordance with the positional relationship between the camera 10 and the light source, and when the quantity of edge lines is at the threshold value β or higher, it is determined that a three-dimensional object is present in the adjacent lane, whereby a three-dimensional object present in the adjacent lane can be suitably detected. Also, in the second embodiment, when an adjacent vehicle is to be detected based on edge information, the light source to the rear and side of the host vehicle is detected, and the degree of certainty that the detected light source is the headlights of an adjacent-adjacent vehicle is assessed. When the degree of certainty is less than a predetermined value, the third threshold value $β_1$ obtained based on the rearward distance from the camera 10 is set as the threshold value β, and on the other hand, when the degree of certainty is at the predetermined value or higher, the fourth threshold value $β_2$ obtained based on the positional relationship between the camera 10 and the light source is set as the threshold value β. In addition to the effects of the first embodiment, in the second embodiment, when the detected light source is the headlights of an adjacent vehicle during detection of an adjacent vehicle based on edge information, it is possible to suitably detect a tire/wheel, which is a characteristic portion of an adjacent vehicle that is present rearward from the headlights (light source), even when the luminance in the vicinity of the headlights (light source) is high due to soil on the lens of the camera 10; and it is possible to effectively prevent errant detection of an adjacent vehicle due to reflected light or the like in which the light of headlights of an adjacent-adjacent vehicle have reflected from the road surface forward from the headlights (light source), and an adjacent vehicle can be suitably detected even when the light is not from the headlights of an adjacent-adjacent vehicle.

The embodiments described above are described in order to facilitate understanding of the present invention, and are not described in order to limit the present invention. Therefore, the elements disclosed in the embodiments above are intended to include all design modifications and equivalents thereto that lie within the technical range of the present invention.

Figure 32:
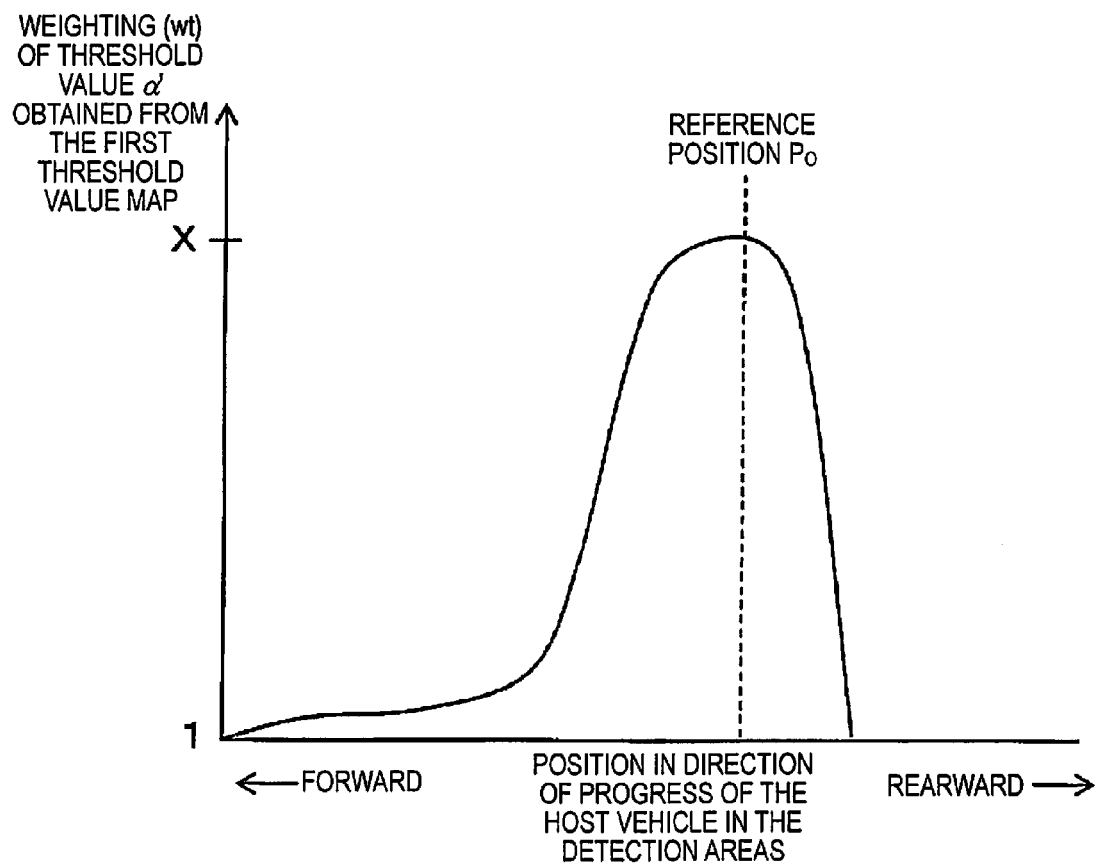
FIG. 32 is a view illustrating the control map according to another embodiment.

An example was given in the first embodiment described above in which the threshold value $α_2'$ obtained from the first threshold value map illustrated in FIG. 10 and the threshold value $α_2''$ obtained from the second threshold value map illustrated in FIG. 11 are weighted with the weighting wt specified in the control map illustrated in FIG. 12, as indicated in formula noted above, to calculate the second threshold value $α_2$, but no limitation is imposed thereby, and it is also possible to, e.g., impart a weighting wt specified in the control map illustrated in FIG. 32 to the threshold value $α_2'$ obtained from die first threshold value map illustrating FIG. 10, as indicated in formula 9 noted below, without the use of the second threshold value map shown in FIG. 11 to calculate the second threshold value $α_2$.

Second threshold value $α_2$=(wt·threshold value $α_2'$ obtained from the first threshold value map)   Formula 9

In the control map illustrated in FIG. 32, the weighting wt in the reference position $P_O$ is set to be x (x>1), and rearward of the reference position $P_O$ the weighting wt is set to be 1. Furthermore, in the control map illustrated in FIG. 32 the weighting wt changes to a higher value forward of the reference position $P_O$ than rearward of the reference position $P_O$ in the same manner as the control map illustrated in FIG. 12. Accordingly, even in this case, when the position of the light source and the reference position $P_O$ are made to correspond, it is possible to suitably detect the tire/wheel of an adjacent vehicle present rearward from the headlights (light source) while effectively preventing errant detection of an adjacent vehicle in the vicinity of headlights. As a result, the adjacent vehicle traveling in an adjacent lane can be suitable detected.

In the first embodiment described above, an example was given in which the absolute value of the difference in the pixel values of the bird's-eye view images $PB_t$ and $PB_{t-1}$ is taken and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," but the threshold value th may be modified in accordance with the positional relationship between the camera 10 and the light source.

Specifically, it is also possible to use a configuration in which, when the degree of certainty is less than a predetermined value, the detection reference setting unit 35 increases the gain of the threshold value th in the area R1 and area R3 in the detection areas A1, A2 more than in the area R2 in the detection areas A1, A2, as illustrated in the drawing on the left in FIG. 8, and, on the other hand, when the degree of certainty is at a predetermined value or higher, the gain of the threshold value th is increased in the area Rf forward from the light source more than in the area Rr rearward from the light source in the detection areas A1, A2, as illustrated in, e.g., the drawing on the right in part (A) of FIG. 13. It is thereby possible to effectively prevent light from the headlights of an adjacent-adjacent vehicle from being errantly detected as an adjacent vehicle in that the light from the headlights of an adjacent-adjacent vehicle is more difficult to detect in terms of the difference waveform $DW_t$ when, e.g., the headlights of an adjacent-adjacent vehicle are shined.

It is also possible to use a configuration in which the gain of the threshold value th is increased in the area Rf forward from the light source more than in the area Rr rearward from the light source in the detection areas A1, A2 when the degree of certainty is at a predetermined value or higher, as illustrated in, e.g., the drawing on the right in part (A) of FIG. 13. The light of headlights of an adjacent-adjacent vehicle V3 thereby become difficult to detect in terms of the difference waveform $DW_t$ because the threshold value th is set to a high value with respect to luminance in the area Rf forward from the light source, and as a result, it is possible to effectively prevent errant detection of an adjacent vehicle due to soil on the lens or reflected light or the like in which the light of headlights of an adjacent-adjacent vehicle V3 have reflected from the road surface. In addition to this configuration, it is furthermore possible to modify the threshold value th in accordance with the luminance in the detection positions in the detection areas A1, A2.

Furthermore, an example of a configuration was given in the first embodiment described above in which the pixel values of the difference image $PD_t$ are detected as '0' and '1' by the alignment unit 32, and the pixels having a pixel value of '1' in the difference image $PD_t$ are counted as difference pixels DP by the three-dimensional object detection unit 33 based on the difference image $PD_t$ to thereby detect an three-dimensional object, but no limitation is imposed thereby, and it is also possible to use a configuration in which, e.g., the pixel values of the difference image $PD_t$ are detected by the alignment unit 32 using the absolute values of the difference values of the bird's-eye view images $PB_t$, $PB_{t-1}$, and the pixels that exceed a predetermined difference threshold value are counted as the difference pixels DP by the three-dimensional object detection unit 33.

An example of a configuration was given in the first embodiment described above in which a captured image of the current moment and an image at a single moment prior are converted to bird's-eye views, the converted bird's-eye views are aligned, a difference image $PD_t$ is then generated, and the generated difference image $PD_t$ is evaluated along the collapsing direction (the direction in which the three-dimensional object collapses when a captured image is converted to a bird's-eye view) to generate a difference waveform $DW_t$, but no limitation is imposed thereby. For example, it is also possible to use a configuration in which only the image at a single moment prior is converted to a bird's-eye view, the converted bird's-eye view is aligned, then converted again to a captured image equivalent, a difference image $PD_t$ is generated using this image and the image at the current moment, and the generated difference image $PD_t$ is evaluated along the direction corresponding to the collapsing direction (i.e., the direction obtained by converting the collapsing direction to a direction in the captured image) to thereby generate the difference waveform $DW_t$. In other words, a bird's-eye view is not expressly required to be generated as a necessity as long as the image at the current moment and the image at a single moment prior are aligned, a difference image $PD_t$ is generated from the difference between the two aligned images, and the difference image $PD_t$ can be evaluated along the collapsing direction of a three-dimensional object when the difference image $PD_t$ is converted to a bird's-eye view.

In the first embodiment described above, the speed of the host vehicle V1 is determined based on a signal from the speed sensor 20, but no limitation is imposed thereby, and it is also possible to use a configuration in which the speed is estimated from a plurality of images at different moments. In this case, the speed sensor 20 is not required and the configuration can be simplified.

Additionally, an example a configuration was given in the first embodiment described above in which, when the degree of certainty is at a predetermined value or higher, the threshold value $\alpha_2'$ obtained from the first threshold value map and the threshold value $\alpha_2''$ obtained from the second threshold value map are weighted with the weighting wt specified in the control map illustrated in FIG. 12 to thereby reduce the threshold value α rearward from the position of the light source in order to suitably detect a tire/wheel of an adjacent vehicle. However, in addition to this configuration, it is also possible to calculate a distance L in the vehicle width direction from the center position of the camera 10 to the centroid position of the light source, and to modify the threshold value α rearward from the reference position $P_O$ corresponding to the light source in accordance with the distance L. For example, it is possible to use a configuration in which the possibility that a detected light source is the headlights of an adjacent-adjacent vehicle traveling in an adjacent-adjacent lane far from the host vehicle is determined to be higher in commensurate fashion to a greater distance L in the vehicle width direction from the center position of the camera 10 to the centroid of the light source, and to increase the threshold value α rearward from the light source. This makes it possible to effectively prevent an adjacent vehicle being erroneously detected by light from the headlights of the adjacent-adjacent vehicle, even rearward of the headlights (light source).

An example of a configuration was given in the second embodiment described above in which the attribute s(xi, yi) of the attention point Pai is set to '1' or '−1' when the luminance value of the attention point Pai and reference point Pri is a threshold value t or greater, and an attention line La in which the attribute s(xi, yi) of the attention point Pai and the attribute s(xi+1, yi+1) of the adjacent attention point Pai+1 are '1' or '−1' in consecutive fashion for a predetermined threshold value θ or greater is detected as an edge line, but in addition to this configuration, it is also possible to modify the threshold value t and the threshold value θ in accordance with the position of the detected light source.

Specifically, it is possible to use a configuration in which the detection reference setting unit 35 increases the gain of the threshold value t and threshold value θ in the area R1 and area R3 in the detection areas A1, A2 more than in the area R2 in the detection areas A1, A2 when the degree of certainty is less than a predetermined value, as illustrated in, e.g., the drawing on the left in FIG. 8, and on the other hand, the detection reference setting unit increases the gain of the threshold value t and threshold value θ in the area Rf forward from the light source more than in the area Rr rearward from the light source in the detection areas A1, A2 when the degree of certainty is at the predetermined value or higher, as illustrated in, e.g., the drawing on the right in part (A) of FIG. 13. The light of headlights of an adjacent-adjacent vehicle thereby becomes difficult to detect as edge lines when a detected light source is the headlights of an adjacent-adjacent vehicle, and it is possible to effectively prevent an image of the light of the headlights of the adjacent-adjacent vehicle from being errantly detected as an adjacent vehicle.

Additionally, an example of a configuration was given in the second embodiment described above in which the change in luminance of the edge lines is calculated in accordance with any of formulas 6, 7, and 8, and among the edge lines, the edge lines in which the change in luminance is at a threshold value tb or higher are excluded, but in addition to this configuration, the threshold value tb may be modified in accordance with the position of the detected light source.

Specifically, it is possible to use a configuration in which the detection reference setting unit 35 increases the gain of the threshold value tb in the area R1 and area R3 in the detection areas A1, A2 more than in the area R2 in the detection areas A1, A2 when the degree of certainty is less than a predetermined value, as illustrated in, e.g., the drawing on the left in FIG. 8, and on the other hand, the detection reference setting unit increases the gain of the threshold value tb in the area Rf forward from the light source more than in the area Rr rearward from the light source in the detection areas A1, A2 when the degree of certainty is at the predetermined value or higher, as illustrated in, e.g., the drawing on the right in part (A) of FIG. 13. In this case as well, the light of headlights of an adjacent-adjacent vehicle thereby becomes difficult to detect as edge lines when a detected light source is the headlights of an adjacent-adjacent vehicle, and it is possible to effectively prevent an image of the light of the headlights of the adjacent-adjacent vehicle from being errantly detected as an adjacent vehicle.

The camera 10 in the embodiments described above corresponds to the image capturing means of the present invention. The viewpoint conversion unit 31 corresponds to the image conversion means of the present invention, and the alignment unit 32, the three-dimensional object detection unit 33, 33*a*, the detection reference setting unit 35, 35*a*, the luminance difference calculation unit 36, and the edge line detection unit 37 correspond to the three-dimensional object detection means of the present invention. The detection reference setting unit 35, 35*a* corresponds to the light source detection means of the present invention.

The invention claimed is:

1. A three-dimensional object detection device comprising:
    an image capturing unit arranged to capture images of a predetermined area relative to an adjacent lane rearward of a host vehicle equipped with the three-dimensional object detection device; and
    a computer including
        an image conversion unit programmed to convert a viewpoint of the images obtained by the image capturing unit to create bird's-eye view images,
        an alignment unit programmed to generate difference image data by obtaining pixel value differences between bird's-eye view images obtained at different times by the image conversion unit,
        a three-dimensional object detection unit programmed to detect a presence of a three-dimensional object within the adjacent lane based on the difference image data, the three-dimensional object detection unit generating difference waveform information by counting and creating a frequency distribution of a number of pixels in the difference image data that indicate a pixel value difference having a predetermined first threshold value or higher, the three-dimensional object detecting unit detecting the presence of the three-dimensional object within the adjacent lane upon determining the difference waveform information is at a predetermined second threshold value or higher,
        a light source detection unit programmed to detect a light source present rearward of the host vehicle based on the images obtained by the image capturing unit, and
        a control unit programmed to set at least one of the first threshold value and the second threshold value higher in a forward area than in a rearward area of the bird's-eye view image when the light source has been detected by the light source detection unit, the forward area being separated from the rearward area by a line connecting the light source and the image capturing unit in the predetermined area.

2. The three-dimensional object detection device according to claim 1, wherein
    the control unit has a first control map indicating a relationship between the first threshold value and luminance, and a second control map indicating a relationship between the first threshold value and luminance in which the first threshold value is set higher than in the first control map, the first threshold value obtained using the first control map and the first threshold value obtained using the second control map being weighted to thereby decide an ultimate first threshold value to be used when the three-dimensional object is to be detected, and
    the control unit weights the first threshold value obtained using the second control map more than the first threshold value obtained in the first control map in the forward area of the predetermined area, and weights the first threshold value obtained using the first control map more than the first threshold value obtained using the second control map in the rearward area of the predetermined area.

3. The three-dimensional object detection device according to claim 1, wherein
    the control unit has a first control map indicating a relationship between the second threshold value and luminance, and a second control map indicating a relationship between the second threshold value and luminance in which the second threshold value is set higher than in the first control map, the second threshold value obtained using the first control map and the second threshold value obtained using the second control map being weighted to thereby decide an ultimate second threshold value to be used when the three-dimensional object is to be detected, and
    the control unit weights the second threshold value obtained using the second control map more than the second threshold value obtained using the first control map in the forward area of the predetermined area, and weights the second threshold value obtained using the first control map more than the second threshold value obtained using the second control map in the rearward area of the predetermined area.

4. The three-dimensional object detection device according to claim 1, wherein
    the control unit sets the first threshold value and the second threshold value higher in the forward area of the predetermined area when the light source has been detected by the light source detection unit.

5. The three-dimensional object detection device according to claim 4, wherein
    the control unit has a first control map indicating a relationship between the first threshold value and luminance, and a second control map indicating a relationship between the first threshold value and luminance in which the first threshold value is set higher than in the first control map, the first threshold value obtained using the first control map and the first threshold value obtained using the second control map being weighted to thereby decide an ultimate first threshold value to be used when the three-dimensional object is to be detected, and
    the control unit weights the first threshold value obtained in the second control map more than the first threshold value obtained using the first control map in the forward area of the predetermined area, and weights of the first threshold value obtained in the first control map more than the first threshold value obtained in the second control map in the rearward area of the predetermined area.

6. The three-dimensional object detection device according to claim 4, wherein
    the control unit has a first control map indicating a relationship between the second threshold value and luminance, and a second control map indicating a relationship between the second threshold value and luminance in which the second threshold value is set higher than in the first control map, the second threshold value obtained using the first control map and the second threshold value obtained using the second control map being weighted to thereby decide an ultimate second threshold value to be used when the three-dimensional object is to be detected, and the control unit weights the second threshold value obtained using the second control map more than the second threshold value obtained using the first control map in the forward area of the predetermined area, and weights the second threshold value obtained in the first control map more than the second threshold value obtained using the second control map in the rearward area of the predetermined area.

7. A three-dimensional object detection device comprising:
an image capturing unit arranged to capture an image of a predetermined area including an adjacent lane rearward of a host vehicle equipped with the three-dimensional object detection device; and
a computer including
an image conversion unit programmed to convert a viewpoint of the image obtained by the image capturing unit to create a bird's-eye view image,
an edge line detection unit programmed to detect edge information in the bird's-eye view image, the edge information indicating if one or more edge lines exist in the bird's-eye view image,
a three-dimensional object detection unit programmed to detect a presence of a three-dimensional object within the adjacent lane based on the edge information, the three-dimensional object detection unit being programmed to determine a quantity of the edge lines in the bird's-eye view image for which a change in luminance on the edge line is smaller than a predetermined first threshold value, and the three-dimensional object detection unit determining the presence of the three-dimensional object within the adjacent lane upon determining the quantity of the edge lines is at a predetermined second threshold value or higher,
a light source detection unit programmed to detect a light source present rearward of the host vehicle based on the images obtained by the image capturing unit, and
a control unit programmed to set at least one of the first threshold value and the second threshold value higher in a forward area than in a rearward area within the bird's-eye view image when the light source has been detected by the light source detection unit, the forward area being separated from the rearward area by a line connecting the light source and the image capturing unit in the predetermined area.

8. The three-dimensional object detection device according to claim 7, wherein
the control unit sets the first threshold value and the second threshold value higher in the forward area of the predetermined area when the light source has been detected by the light source detection unit.

9. The three-dimensional object detection device according to claim 7, wherein
the control unit has a first control map indicating a relationship between the first threshold value and luminance, and a second control map indicating a relationship between the first threshold value and luminance in which the first threshold value is set higher than in the first control map, the first threshold value obtained using the first control map and the first threshold value obtained using the second control map being weighted to thereby decide an ultimate first threshold value to be used when the three-dimensional object is to be detected, and the control unit weights the first threshold value obtained using the second control map more than the first threshold value obtained using the first control map in the forward area of the predetermined area, and weights the first threshold value obtained using the first control map more than the first threshold value obtained in the second control map using the rearward area of the predetermined area.

10. The three-dimensional object detection device according to claim 7, wherein
the control unit has a first control map indicating a relationship between the second threshold value and luminance, and a second control map indicating a relationship between the second threshold value luminance and in which the second threshold value is set higher than in the first control map, the second threshold value obtained using the first control map and the second threshold value obtained using the second control map being weighted to thereby decide an ultimate second threshold value to be used when the three-dimensional object is to be detected, and
the control unit weights the second threshold value obtained using the second control map more than the second threshold value obtained using the first control map in the forward area of the predetermined area, and weights the second threshold value obtained using the first control map more than the second threshold value obtained using the second control map in the rearward area of the predetermined area.

11. The three-dimensional object detection device according to claim 8, wherein
the control unit has a first control map indicating a relationship between the first threshold value and luminance, and a second control map indicating a relationship between the first threshold value and luminance in which the first threshold value is set higher than in the first control map, the first threshold value obtained using the first control map and the first threshold value obtained using the second control map being weighted to thereby decide an ultimate first threshold value to be used when the three-dimensional object is to be detected, and
the control unit weights the first threshold value obtained using the second control map more than the first threshold value obtained using the first control map in the forward area of the predetermined area, and weights the first threshold value obtained using the first control map more than the first threshold value obtained using the second control map in the rearward area of the predetermined area.

12. The three-dimensional object detection device according to claim 8, wherein
the control unit has a first control map indicating a relationship between the second threshold value and luminance, and a second control map indicating a relationship between the second threshold value and luminance and in which the second threshold value is set higher than in the first control map, the second threshold value obtained using the first control map and the second threshold value obtained using the second control map being weighted to thereby decide an ultimate second threshold value to be used when the three-dimensional object is to be detected, and
the control unit weighted the second threshold value obtained using the second control map more than the second threshold value obtained using the first control map in the forward area of the predetermined area, and weights the second threshold value obtained using the first control map more than the second threshold value obtained using the second control map in the rearward area of the predetermined area.

13. A three-dimensional object detection device comprising:
an image capturing unit arranged to capture an image of a predetermined area relative to an adjacent lane rearward of a host vehicle equipped with the three-dimensional object detection device; and
a computer including
an image conversion unit programmed to convert a viewpoint of the image obtained by the image capturing unit to create a bird's-eye view image,
a luminance difference calculation unit programmed to calculate luminance differences between pairs of pixels arranged along a direction in which the three-dimensional object collapses when the viewpoint is converted to the bird's-eye view image,
a three-dimensional object detection unit programmed to detect a presence of a three-dimensional object within the adjacent lane based on the luminance differences calculated by the luminance difference calculation unit, the of pixels in the bird's-eye view image obtained by the image conversion unit, the three-dimensional object detection unit determining a quantity of the calculated luminance differences at a predetermined first threshold value or greater, and the three-dimensional object detection unit determining the presence of the three-dimensional object upon determining that the quantity is at a predetermined second threshold value or greater,
a light source detection unit programmed to detect a light source present rearward of the host vehicle based on the image obtained by the image capturing unit, and
a control unit programmed to set at least one of the first threshold value and the second threshold value higher in a forward area than a rearward area of the bird's-eye view image when the light source has been detected by the light source detection unit, the forward area being separated from the rearward area by a line connecting the light source and the image capturing unit in the predetermined area.

* * * * *